United States Patent
Dettinger et al.

(10) Patent No.: US 7,539,662 B2
(45) Date of Patent: May 26, 2009

(54) DEALING WITH COMPOSITE DATA THROUGH DATA MODEL ENTITIES

(75) Inventors: Richard D. Dettinger, Rochester, MN (US); Jennifer L. LaRocca, Rochester, MN (US); Richard J. Stevens, Mantorville, MN (US); Jeffrey W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 11/360,353

(22) Filed: Feb. 23, 2006

(65) Prior Publication Data

US 2006/0155692 A1 Jul. 13, 2006

Related U.S. Application Data

(62) Division of application No. 10/403,356, filed on Mar. 31, 2003, now Pat. No. 7,054,877.

(51) Int. Cl.
*G06F 7/00* (2006.01)
*G06F 17/30* (2006.01)

(52) U.S. Cl. ............ 707/2; 707/1; 707/6; 707/10; 707/201

(58) Field of Classification Search .......... 707/2–4, 707/100–102, 104.1
See application file for complete search history.

(56) References Cited

U.S. PATENT DOCUMENTS

| | | | | |
|---|---|---|---|---|
| 5,734,887 A * | 3/1998 | Kingberg et al. | ............... | 707/4 |
| 5,809,497 A * | 9/1998 | Freund et al. | ................. | 707/2 |
| 5,918,232 A * | 6/1999 | Pouschine et al. | ........ | 707/103 R |
| 6,061,506 A * | 5/2000 | Wollaston et al. | ............... | 705/1 |
| 6,553,368 B2 * | 4/2003 | Martin et al. | ................... | 707/3 |
| 6,609,123 B1 * | 8/2003 | Cazemier et al. | ............... | 707/4 |
| 6,651,055 B1 * | 11/2003 | Kilmer et al. | ................... | 707/3 |
| 6,725,225 B1 * | 4/2004 | Kori | ........................... | 707/101 |
| 6,725,227 B1 * | 4/2004 | Li | ............................... | 707/102 |
| 6,928,431 B2 | 8/2005 | Dettinger et al. | | |
| 6,954,748 B2 | 10/2005 | Dettinger et al. | | |

(Continued)

OTHER PUBLICATIONS

"A Data Warehouse Conceptual Data Model for Multidimensional Aggregation"—Enrico Franconi & Ulrike Sattler—Proceedings of the International Workshop on Design and Management of Data Warehouse (DMDW'99) Heidelburg, Germany, Jun. 14-15, 1999 (pp. 1-10).*

(Continued)

*Primary Examiner*—John E Breene
*Assistant Examiner*—Anh Ly
(74) *Attorney, Agent, or Firm*—Patterson & Sheridan, LLP

(57) ABSTRACT

The present invention is generally directed to a system, method and article of manufacture for accessing data represented abstractly through an abstraction model. In one embodiment, a data repository abstraction layer provides a logical view of an underlying data repository that is independent of the particular manner of data representation. A query abstraction layer is also provided and is based on the data repository abstraction layer. A runtime component performs conversion of an abstract query (i.e., a request for results or a request to modify data) into a form that can be used against a particular physical data representation. Abstract and/or physical queries are transformed according to model entities which define a relationship between logical fields of the data repository abstraction layer.

7 Claims, 29 Drawing Sheets

U.S. PATENT DOCUMENTS

| | | | |
|---|---|---|---|
| 6,978,324 B1* | 12/2005 | Black | 707/200 |
| 6,985,912 B2* | 1/2006 | Mullins et al. | 707/103 R |
| 6,996,558 B2 | 2/2006 | Dettinger et al. | |
| 7,249,118 B2* | 7/2007 | Sandler et al. | 707/1 |
| 7,363,287 B2* | 4/2008 | Kilmer et al. | 707/2 |
| 2002/0026630 A1* | 2/2002 | Schmidt et al. | 717/103 |
| 2002/0078068 A1* | 6/2002 | Krishnaprasad et al. | 707/104.1 |
| 2002/0091702 A1* | 7/2002 | Mullins | 707/100 |
| 2002/0091990 A1* | 7/2002 | Little et al. | 703/22 |
| 2003/0172056 A1* | 9/2003 | Dettinger et al. | 707/3 |
| 2003/0217033 A1* | 11/2003 | Sandler et al. | 707/1 |
| 2004/0039736 A1* | 2/2004 | Kilmer et al. | 707/3 |

OTHER PUBLICATIONS

"Implementing a Domain Model for Data Structures"—Don Batory, Vivek Singhal and Mary Sirkin—International Journal of Software Engineering and Knowledge Engineering, 2(3):375-403, Sep. 1992 (pp. 1-24).*

* cited by examiner

EFFECT OF MODEL ENTITY ON QUERY RESULT FIELDS

ABSTRACT QUERY (INITIAL)

Model Entity = 'Patient' — 702

Query Conditions
  Gender = 'Female' AND
  Glucose Test > 10

Result Fields
  Gender
  Glucose Test
  Age

ABSTRACT QUERY (EFFECTIVE)

Model Entity = 'Patient'

Query Conditions
  Gender = 'Female' AND
  Glucose Test > 10

Result Fields
  Gender
  Glucose Test
  Age
  *Patient ID*

CREATE ABSTRACT QUERY

SELECT QUERY FOCUS FROM LIST:

Account
Patient
Test

NEXT >>
804
802

*Fig. 8*

CREATE ABSTRACT QUERY

QUERY FOCUS: Patient

Query Conditions

ADD ...   NEXT >>

*Fig. 9*

CREATE ABSTRACT QUERY

QUERY FOCUS: Patient

Query Conditions

Gender = 'Female' AND
Glucose Test > 10

ADD ...   NEXT >>
         1004    1002

*Fig. 10*

CREATE ABSTRACT QUERY

QUERY FOCUS: Patient

Query Conditions (1002):
Gender = 'Female' AND Glucose Test > 10

Result Fields (1102):
Patient ID

[ADD ...] [<< BACK] [FINISH]

*Fig. 11*

CREATE ABSTRACT QUERY

QUERY FOCUS: Patient

Query Conditions (1002):
Gender = 'Female' AND Glucose Test > 10

Result Fields (1102):
Patient ID
Gender
Glucose Test
Age

[ADD ...] [<< BACK] [FINISH]

*Fig. 12*

EFFECT OF MODEL ENTITY ON CONCRETE QUERY GENERATION (SQL EXAMPLE)

ABSTRACT QUERY — 1400

Model Entity = 'Patient' — 1406

Query Conditions — 1402
- Gender = 'Female' AND
- Glucose Test = 5 AND
- Glucose Test > 10

Result Fields — 1404
- Gender
- Age
- Patient ID

↓ CONVERSION BY APPLICATION OF MODEL ENTITY AND RELATIONSHIP LOGIC

CONCRETE QUERY (SQL Example) — 1408

Select T1.gend, T1.age, T1.id from
  PatientInfo T1,
  TestInfo T2,
  TestInfo T3

Where
  T1.id = T2.id AND
  T1.id = T3.id AND — 1410
  T2.id = T3.id AND
  T1.gend = 'Female' AND
  T2.val > 5 AND
  T3.val > 10

*Fig. 14*

CREATE ABSTRACT INSERT

SELECTED INITIAL FIELDS TO INSERT:
- Patient ID
- First Name
- Last Name
- Birth Date
- Gender
- Street
- City
- State
- Postal Code
- Test Date
- Glucose Test
- Account Number
- Balance
- ...

SELECTED FIELDS:
- Last Name
- State

[ NEXT >> ]

*Fig. 24*

CREATE ABSTRACT INSERT

ENTER VALUES TO INSERT (* = REQUIRED):

- Last Name (*) — 2502A
- State (*) — 2502B
- First Name (*) — 2502C
- Patient ID — 2502D [34982]
- Birth Date — 2502E
- Gender — 2502F
- Street — 2502G
- City — 2502H
- Postal Code — 2502I

[ NEXT >> ]

CREATE ABSTRACT INSERT

ENTER VALUES TO INSERT (* = REQUIRED):

| | |
|---|---|
| Last Name (*) | McGoon |
| State (*) | Ohio |
| First Name (*) | Mary |
| Patient ID | 34982 |
| Birth Date | 09/01/59 |
| Gender | Female |
| Street | 205 1st |
| City | Toledo |
| Postal Code | 43601 |

NEXT >>

DEALING WITH COMPOSITE DATA THROUGH DATA MODEL ENTITIES

REFERENCE TO PARENT APPLICATION

This patent application is a divisional application of patent application Ser. No. 10/403,356 filed by Dettinger, et al, on Mar. 31, 2003 now U.S. Pat. No. 7,054,877, entitled "Dealing with Composite Data Through Data Model Entities", which is incorporated herein by reference.

CROSS-REFERENCE TO RELATED APPLICATIONS

This application is related to the following commonly owned applications assigned to International Business Machines, Inc.: U.S. patent application Ser. No. 10/083,075, filed Feb. 22, 2002, entitled "IMPROVED APPLICATION FLEXIBILITY THROUGH DATABASE SCHEMA AND QUERY ABSTRACTION"; U.S. patent application Ser. No. 10/403,366, filed on Mar. 31, 2003 and entitled "MODIFICATION OF A DATA REPOSITORY BASED ON AN ABSTRACT DATA REPRESENTATION"; U.S. patent application Ser. No. 10/403,960, filed on Mar. 31, 2003 and entitled "SEQUENCED MODIFICATION OF MULTIPLE ENTITIES BASED ON AN ABSTRACT DATA REPRESENTATION"; U.S. patent application Ser. No. 10/132,228, entitled "DYNAMIC END USER SPECIFIC CUSTOMIZATION OF AN APPLICATION'S PHYSICAL DATA LAYER THROUGH A DATA REPOSITORY ABSTRACTION LAYER"; and U.S. patent application Ser. No. 10/131,984, entitled "REMOTE DATA ACCESS AND INTEGRATION OF DISTRIBUTED DATA SOURCES THROUGH DATA SCHEMA AND QUERY ABSTRACTION", which are hereby incorporated herein in their entirety.

BACKGROUND OF THE INVENTION

1. Field of the Invention

The present invention generally relates to data processing, and more particularly, to the accessing data through a logical framework.

2. Description of the Related Art

In commonly assigned U.S. patent application Ser. No. 10/083,075 (the '075 application), filed Feb. 22, 2002, entitled "Improved Application Flexibility Through Database Schema and Query Abstraction", a framework is disclosed for logically/abstractly viewing physical data. The framework of the '075 application provides a requesting entity (i.e., an end-user or application) with an abstract representation of physical data. In this way, the requesting entity is decoupled from the underlying physical data to be accessed. Logical queries based on the framework can be constructed without regard for the makeup of the physical data. Further, changes to the physical data do not necessitate changes to applications accessing the physical data.

However, even an abstract view of an underlying data environment can be complex, in particular when the physical data repository contains large volumes of information that span a number of usage scenarios. For instance, the data warehouse for a large, clinical institution may contain 1000s of fields spanning patient demographic, test and diagnosis information as well as information concerning the operational aspects of the clinic: appointment records, patient loads for physicians and lab test accuracy and turn around time metrics. Representing this environment in a data abstraction model as a set of individual logical fields may be insufficient for a number of usage scenarios. Consider, for example, situations where different user communities have different focus areas of interest. Some users may be solely interested in patients and their records. Others may be concerned with distribution of lab test values or usage data for various types of lab equipment. There may be overlap in the individual fields for each area of interest; however, the method used to correlate data may vary depending on whether the focus is on patient or lab tests. An abstraction model defining individual logical fields may also be insufficient in cases where users are inserting new content or deleting content from the warehouse, for example, adding a new patient to the warehouse or deleting an existing patient from the warehouse. In a basic data abstraction model approach, such as is described in the '075 application, the complete details concerning a patient may be defined by a set of logical fields. Without additional information, it would be difficult, if not impossible, for a user to know which set of logical fields constitutes the concept of a patient. In this case, "patient" represents a higher level view of the information in the warehouse and can be thought of as a composite of individual logical fields defined by the abstract data model. Another limitation of such an abstraction model occurs in situations requiring unique identification of entities in the underlying model. Additional information is required to understand the set of logical fields that together uniquely identify each entity, such as patient, within the underlying data environment. For example, it may be desirable or even required to always include a patient identifier (id) in results of queries designed to return patient information.

Possible solutions to these types of scenarios, would require the user or data access application to have specific knowledge of the make-up of the underlying data environment, enough knowledge to understand what constitutes an entity (such as patient) and how to uniquely identify each entity in the underlying data model. In essence, the application is hard coded to deal with a particular data environment. This approach works if the underlying data environment is static and known in advance, but does not address the more general situation where the data environment is changing over time and/or the situation where the details of the underlying schema are not known in advance. These would be the types of situations that a general purpose, data update and query application would encounter.

Therefore, what is needed is the logical representation of entities defined by one or more logical fields, and in particular a plurality of logical fields.

SUMMARY OF THE INVENTION

The present invention provides a method, system and article of manufacture for accessing physical data through an abstraction model. The abstraction model includes metadata describing and defining a plurality of logical fields. The metadata also describes associations between sets of logical fields each of which may correspond to (i.e., point to) separate physical entities. The sets of logical fields are referred to as model entities, which facilitate accessing physical data. In some cases, a model entity may also be defined by a single logical field corresponding to a single physical entity.

One embodiment provides a method of providing a logical framework for defining abstract operations for accessing physical data comprising a plurality of physical entities each comprising a plurality of physical fields. The method includes providing an abstract model for defining abstract operation specifications logically describing operations to access the data. The abstract model may include a plurality of logical fields; a mapping rule for each of the plurality of logical fields, which map each of the plurality of logical fields to at least one of the physical entities of the data; and a plurality of model entity definitions, each comprising at least one logical field corresponding to a physical entity. In one embodiment, the model entity definition comprises at least two logical fields each corresponding to a separate physical entity. The method further includes providing an interface from which each of the plurality of model entity definitions is selectable in generating an abstract operation specification to access the data; and providing a run-time component to transform, according to the abstract model, the abstract operation specifications into physical operation specifications consistent with the physical data.

Another method is provided for constructing abstract queries defined by a plurality of logical fields which map to a plurality of physical entities of physical data having a particular physical data representation in a database. In one embodiment, the method includes receiving user input via a user interface, the input comprising a reference to a model entity definition comprising at least one logical field corresponding to a physical entity. Based on the model entity definition, at least one of the two or more logical fields is programmatically added to an abstract query.

Yet another method provides for constructing abstract queries defined by a plurality of logical fields which map to a plurality of physical entities of physical data having a particular physical data representation in a database. In one embodiment, the method includes receiving, via a user interface, an abstract query comprising a selection of a model entity definition comprising two or more logical fields each corresponding to a separate physical entity; a plurality of query conditions defined by selected logical fields and a corresponding value for each of the selected logical fields; and at least one result field defined by selected logical fields. A determination is then made as to whether the abstract query includes more than one ANDed query condition for a given logical field corresponding to a physical entity. If so, a further determination is made as to whether a one-to-many relationship exists between the model entity definition and the physical entity corresponding to the given logical field.

Yet another embodiment provides a method for modifying physical data comprising a plurality of physical entities and having a particular physical data representation in a database. The method includes receiving a selection of an abstract modification operation and receiving a selection of a model entity definition on which to perform the abstract modification operation, the model entity definition comprising two or more logical fields each corresponding to a separate physical entity. Based on at least the received selections, at least two physical modification statements are generated, each modifying one of the two separate physical entities of the physical data. To ensure the integrity of data the at least two physical modification statements are ordered. The modification operations are then executed according to the physical modification statements, whereby the data is modified.

Yet another embodiment provides a computer-readable medium containing a program which, when executed by a processor, performs operations for modifying physical data comprising a plurality of physical entities and having a particular physical data representation in a database. The operation includes identifying two or more logical fields defined for a specified model entity definition on which to perform an abstract modification operation, the two or more logical fields each corresponding to a separate physical entity of the physical data. The operation further includes generating a single abstract modification specification abstractly defining modification operations to modify the data, wherein the abstract modification specification comprises at least the two or more logical fields. The operation further includes transforming the abstract modification specification into at least two physical modification statements consistent with the particular physical data representation according to mapping rules which map the logical fields of the abstract modification specification to their corresponding physical entities, wherein each of the at least two physical modification statements modifies a different physical entity of the data. The operation further includes ordering the at least two physical modification statements and then executing the modification operations according to the physical modification statements, whereby the data is modified.

Yet another embodiment provides a computer-readable medium containing a program which, when executed by a processor, provides a logical framework for defining abstract query operations. The program includes an abstract model for defining abstract queries logically describing operations to query the data. In one embodiment, the abstract model comprises (i) a plurality of logical fields; (ii) a mapping rule for each of the plurality of logical fields, which map the plurality of logical fields to physical entities of the data; and (iii) a plurality of model entity definitions, each comprising at least two logical fields each corresponding to a separate physical entity. The program further includes a run-time component configured with transformation instructions to transform an abstract query, comprising logical fields selected according to a selected model entity definition, into a physical query consistent with the physical data.

Yet another embodiment provides a computer-readable medium containing a program which, when executed by a processor, provides a logical framework for defining abstract modification operations for modifying physical data. In one embodiment, the framework includes an abstract model for defining an abstract modification specification logically describing operations to access the data, the abstract model comprising: (i) a plurality of logical fields; (ii) a mapping rule for each of the plurality of logical fields, which map the plurality of logical fields to physical entities of the data; (iii) a plurality of model entity definitions, each comprising at least two logical fields each corresponding to a separate physical entity; and (iv) a physical entity relationships specification defining interrelationships between the physical entities of the data. The framework further includes a run-time component configured with: (i) transformation instructions to transform an abstract modification specification, comprising logical fields selected according to a selected model entity definition, into at least two physical modification statements consistent with the physical data, wherein each of the at least two physical modification statements modifies a different physical entity of the data; and (ii) ordering instructions to order the at least two physical modification statements according to the physical entity relationships specification.

Still another embodiment provides a computer comprising a memory and at least one processor, and further comprising a logical framework for defining abstract modification operations for modifying physical data, the logical framework comprising an abstract model for defining an abstract modification specification logically describing an operation to modify the data. The abstract model may include (i) a plurality of logical fields; (ii) a mapping rule for each of the plurality of logical fields, which map the plurality of logical fields to physical entities of the data; and (iii) a plurality of model entity definitions, each comprising at least two logical fields each corresponding to a separate physical entity. A user interface is provided from which each of the plurality of model entity definitions is selectable. A run-time component transforms an abstract query, comprising logical fields selected according to a selected model entity definition, into a physical query consistent with the physical data.

Still another embodiment provides a computer comprising a memory and at least one processor, and further comprising a logical framework for defining abstract modification operations for modifying physical data, the logical framework comprising an abstract model for defining an abstract modification specification logically describing an operation to modify the data. The abstract model may include (i) a plurality of logical fields; (ii) a mapping rule for each of the plurality of logical fields, which map the plurality of logical fields to physical entities of the data; (iii) a plurality of model entity definitions, each comprising at least two logical fields each corresponding to a separate physical entity; and (iv) a physical entity relationships specification defining interrelationships between the physical entities of the data. A user interface is provided from which each of the plurality of model entity definitions is selectable. A run-time component transforms the abstract modification specification into at least two physical modification statements consistent with the physical data and to order the at least two physical modification statements according to the physical entity relationships specification, wherein each of the at least two physical modification statements modifies a different physical entity of the data.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 7 illustrates the augmentation of result fields of an initial abstract query according to a specified model entity.

FIGS. 8-12 are illustrative user interface screens for creating an abstract query using model entities.

FIG. 14 illustrates the generation of a physical query based on the specification of a model entity.

FIG. 24 is the user interface screen of FIG. 23 after being populated with selections of model entities made from a model entities selection menu.

FIG. 25 is a screen configured with a plurality of input fields selected according to the model entities selections made from the user interface screen of FIG. 24.

FIG. 26 is the screen of FIG. 25 after having been populated with values input by a user, as well as a generated value.

DETAILED DESCRIPTION OF THE PREFERRED EMBODIMENTS

Introduction

Figure 1:
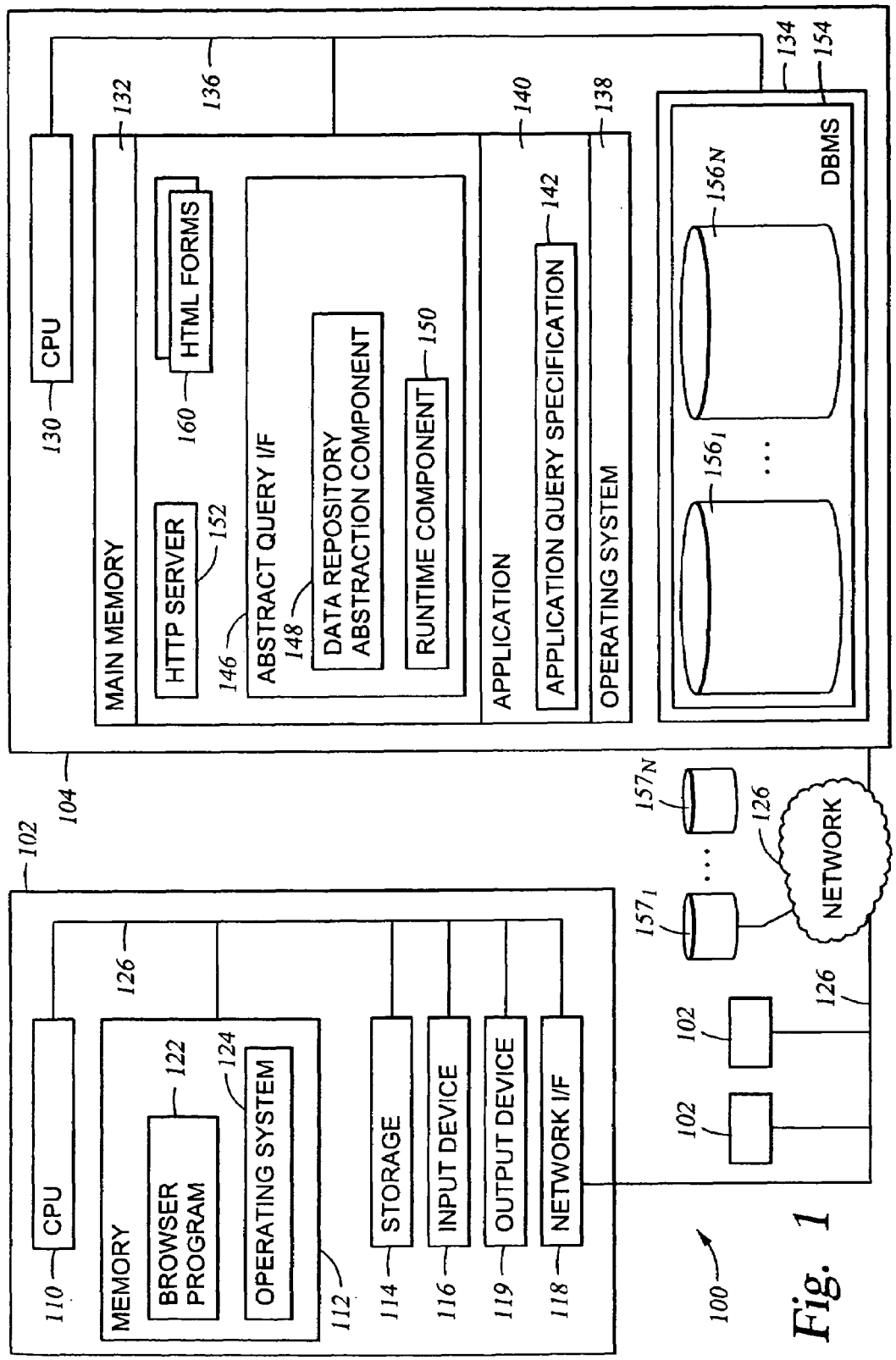
FIG. 1 is a block diagram of an illustrative computer architecture.

The present invention provides a method, system and article of manufacture for accessing physical data through an abstraction model.

One embodiment of the invention is implemented as a program product for use with a computer system and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

In one embodiment, a particular data definition framework (also referred to herein as a data repository abstraction (DRA) layer/component) is provided for accessing and modifying data independent of the particular manner in which the data is physically represented. The data may be located in a single repository (i.e., source) of data or a plurality of different data repositories. Thus, the DRA may provide a logical view of one or more underlying data repositories. By using an abstract representation of a data repository, the underlying physical representation can be more easily changed or replaced without affecting the application making the changes. Instead, the abstract representation is changed with no changes required by the application. In addition, multiple abstract data representations can be defined to support different applications against the same underlying database schema that may have different default values or required fields.

The abstraction model (DRA) includes metadata describing and defining a plurality of logical fields. The metadata also describes associations between sets of logical fields. The sets of logical fields are referred to as model entities. The model entities are used to access data through queries and modification operations. In one aspect, model entities define required output fields for queries involving the model entity. In another aspect, model entities establish a focal point within the data environment that can be used to implement the appropriate logic needed to correlate information that spans multiple physical entities (e.g. tables) in the underlying physical data repository. In still another aspect, model entities define a minimal set of fields used to derive the complete set of fields involved in data insert and delete operations for an instance of the model entity.

Physical View of Environment

FIG. 1 depicts a block diagram of a networked system 100 in which embodiments of the present invention may be implemented. In general, the networked system 100 includes a client (i.e., generally any requesting entity such as a user or application) computer 102 (three such client computers 102 are shown) and at least one server computer 104 (one such server computer 104 is shown). The client computer 102 and the server computer 104 are connected via a network 126. In general, the network 126 may be a local area network (LAN) and/or a wide area network (WAN). In a particular embodiment, the network 126 is the Internet. However, it is noted that aspects of the invention need not be implemented in a distributed environment. As such, the client computers 102 and the server computer 104 are more generally representative of any requesting entity (such as a user or application) issuing queries and a receiving entity configured to handle the queries, respectively.

The client computer 102 includes a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, trackball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any entry/exit device configured to allow network communications between the client computer 102 and the server computer 104 via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux and Microsoft's Windows®. More generally, any operating system supporting the functions disclosed herein may be used.

The memory 112 is also shown containing a browser program 122 that, when executed on CPU 110, provides support for navigating between the various servers 104 and locating network addresses at one or more of the servers 104. In one embodiment, the browser program 122 includes a web-based Graphical User Interface (GUI), which allows the user to display Hyper Text Markup Language (HTML) information. More generally, however, the browser program 122 may be any GUI-based program capable of rendering the information transmitted from the server computer 104.

The server computer 104 may be physically arranged in a manner similar to the client computer 102. Accordingly, the server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

The server computer 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used.

The memory 132 further includes one or more applications 140 and an abstract query interface 146. The applications 140 and the abstract query interface 146 are software products comprising a plurality of instructions that are resident at various times in various memory and storage devices in the computer system 100. When read and executed by one or more processors 130 in the server 104, the applications 140 and the abstract query interface 146 cause the computer system 100 to perform the steps necessary to execute steps or elements embodying the various aspects of the invention. The applications 140 (and more generally, any requesting entity, including the operating system 138 and, at the highest level, users) issue queries against a database. Illustrative sources against which queries may be issued include local databases $56_1 \ldots 156_N$, and remote databases $157_1 \ldots 157_N$, collectively referred to as database(s) 156-157). Illustratively, the databases 156 are shown as part of a database management system (DBMS) 154 in storage 134. More generally, as used herein, the term "databases" refers to any collection of data regardless of the particular physical representation. By way of illustration, the databases 156-157 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data which is described by a data definition framework such as the DRA described herein.

In one embodiment, the queries issued by the applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed using logical fields defined by the abstract query interface 146. In particular, the logical fields used in the abstract queries are defined by a data repository abstraction component 148 of the abstract query interface 146. The abstract queries are executed by a runtime component 150 which transforms the abstract queries into a form (referred to herein as a concrete query) consistent with the physical representation of the data contained in one or more of the databases 156-157. The queries may be configured to access the data and return results, or to modify (i.e., insert, delete or update) the data. The application query specification 142 and the abstract query interface 146 are further described with reference to FIGS. 2A-B.

In one embodiment, elements of a query are specified by a user through a graphical user interface (GUI). The content of the GUIs is generated by the application(s) 140. In a particular embodiment, the GUI content is hypertext markup language (HTML) content which may be rendered on the client computer systems 102 with the browser program 122. Accordingly, the memory 132 includes a Hypertext Transfer Protocol (http) server process 138 (e.g., a web server) adapted to service requests from the client computer 102. For example, the process 138 may respond to requests to access a database(s) 156, which illustratively resides on the server 104. Incoming client requests for data from a database 156-157 invoke an application 140. When executed by the processor 130, the application 140 causes the server computer 104 to perform the steps or elements embodying the various aspects of the invention, including accessing the database(s) 156-157. In one embodiment, the application 140 comprises a plurality of servlets configured to build GUI elements, which are then rendered by the browser program 122. Where the remote databases 157 are accessed via the application 140, the data repository abstraction component 148 is configured with a location specification identifying the database containing the data to be retrieved. This latter embodiment will be described in more detail below.

FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable future changes in a particular markup language as well as to other languages presently unknown. Likewise, the http server process 138 shown in FIG. 1 is merely illustrative and other embodiments adapted to support any known and unknown protocols are contemplated.

Logical/Runtime View of Environment

Figure 2A:
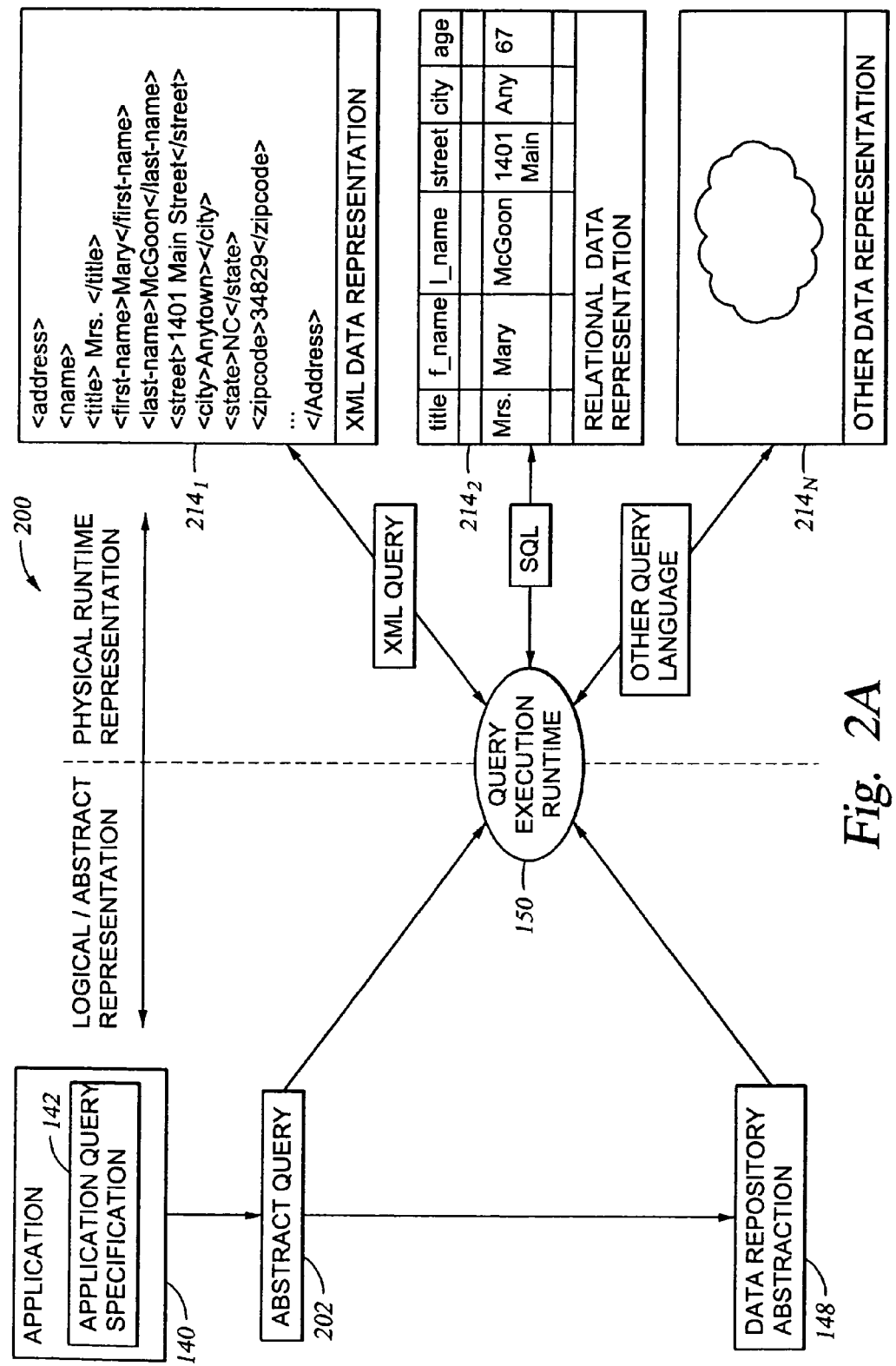
FIG. 2 is a relational view of software components of one embodiment of the invention configured to process queries against a physical data source through an abstract representation of the physical data source.
Figure 2B:
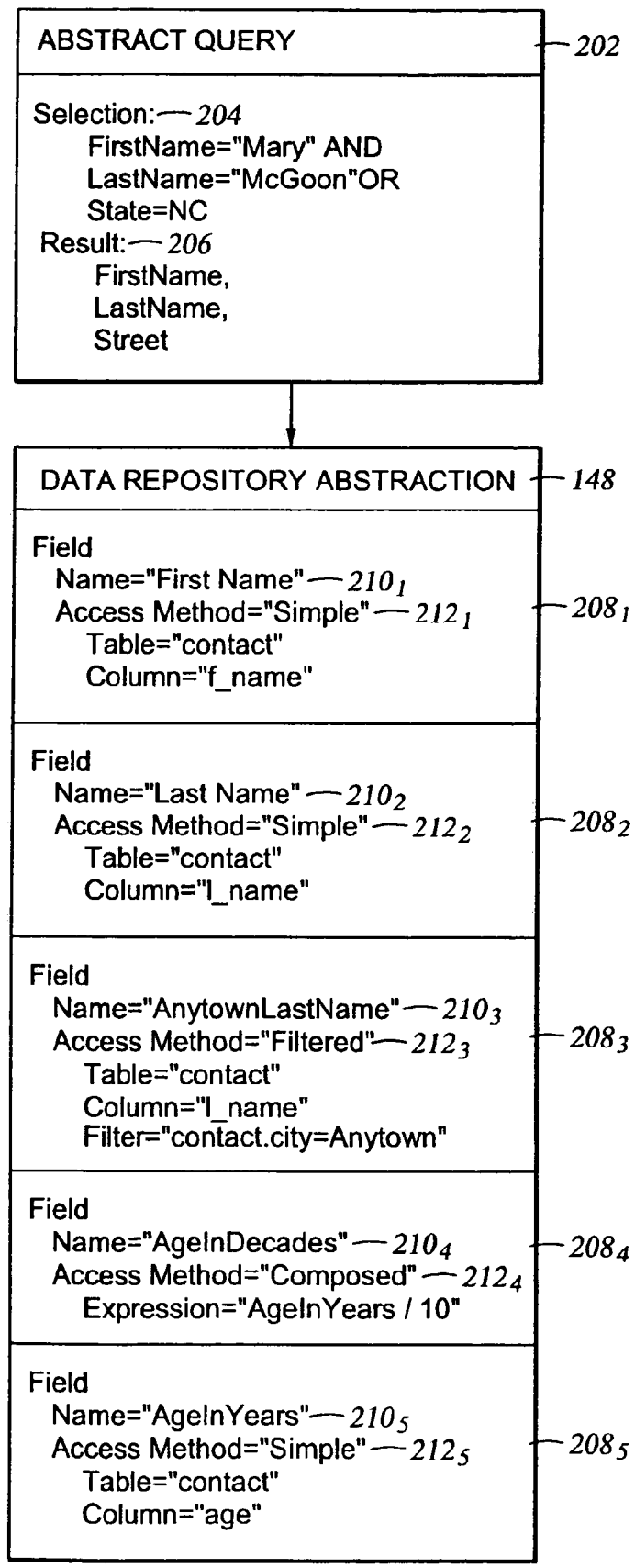

FIGS. 2A-B show a plurality of interrelated components of the invention. The requesting entity (e.g., one of the applications 140) issues a query 202 as defined by the respective application query specification 142 of the requesting entity. The resulting query 202 is generally referred to herein as an "abstract query" because the query is composed according to abstract (i.e., logical) fields rather than by direct reference to the underlying physical data entities in the databases 156-157. As a result, abstract queries may be defined that are independent of the particular underlying data representation used. In one embodiment, the application query specification 142 may include both criteria used for data selection (selection criteria 204) and an explicit specification of the fields to be returned (return data specification 206) based on the selection criteria 204.

The logical fields specified by the application query specification 142 and used to compose the abstract query 202 are defined by the data repository abstraction component 148. In general, the data repository abstraction component 148 exposes information as a set of logical fields that may be used within a query (e.g., the abstract query 202) issued by the application 140 to specify criteria for data selection and specify the form of result data returned from a query operation. The logical fields are defined independently of the underlying data representation being used in the databases 156-157, thereby allowing queries to be formed that are loosely coupled to the underlying data representation.

In general, the data repository abstraction component 148 comprises a plurality of field specifications $208_1, 208_2, 208_3, 208_4$ and $208_5$ (five shown by way of example), collectively referred to as the field specifications 208. Specifically, a field specification is provided for each logical field available for composition of an abstract query. Each field specification comprises a logical field name $210_1, 210_2, 210_3, 210_4, 210_5$ (collectively, field name 210) and an associated access method $212_1, 212_2, 212_3, 212_4, 212_5$ (collectively, access method 212). The access methods associate (i.e., map) the logical field names to a particular physical data representation $214_1, 214_2 \ldots 214_N$ in a database (e.g., one of the databases 156). By way of illustration, two data representations are shown, an XML data representation $214_1$ and a relational data representation $214_2$. However, the physical data representation $214_N$ indicates that any other data representation, known or unknown, is contemplated.

Any number of access methods are contemplated depending upon the number of different types of logical fields to be supported. In one embodiment, access methods for simple fields, filtered fields and composed fields are provided. The field specifications $208_1, 208_2$ and $208_5$ exemplify simple field access methods $212_1$, $212_2$, and $212_5$, respectively. Simple fields are mapped directly to a particular entity in the underlying physical data representation (e.g., a field mapped to a given database table and column). By way of illustration, the simple field access method $212_1$ shown in FIG. 2B maps the logical field name $210_1$ ("FirstName") to a column named "f_name" in a table named "contact". The field specification $208_3$ exemplifies a filtered field access method $212_3$. Filtered fields identify an associated physical entity and provide rules used to define a particular subset of items within the physical data representation. An example is provided in FIG. 2B in which the filtered field access method $212_3$ maps the logical field name $210_3$ ("AnytownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification $208_4$ exemplifies a composed field access method $212_4$. Composed access methods compute a logical field from one or more physical fields using an expression supplied as part of the access method definition. In this way, information which does not exist in the underlying data representation may computed. In the example illustrated in FIG. 2B the composed field access method $212_3$ maps the logical field name $210_3$ "AgeInDecades" to "AgeInYears/10". Another example is a sales tax field that is composed by multiplying a sales price field by a sales tax rate.

It is noted that the data repository abstraction component 148 shown in FIG. 2B is merely illustrative of selected logical field specifications and is not intended to be comprehensive. As such, the abstract query 202 shown in FIG. 2B includes some logical fields for which specifications are not shown in the data repository abstraction component 148, such as "State" and "Street".

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 208 of the data repository abstraction component 148 shown in FIG. 2A are representative of logical fields mapped to data represented in the relational data representation $214_2$. However, other instances of the data repository abstraction component 148 map logical fields to other physical data representations, such as XML. Further, in one embodiment, a data repository abstraction component 148 is configured with access methods for procedural data representations. One embodiment of such a data repository abstraction component 148 is described below with respect to FIG. 8.

An illustrative abstract query corresponding to the abstract query 202 shown in FIG. 2 is shown in Table I below. By way of illustration, the data repository abstraction 148 is defined using XML. However, any other language may be used to advantage.

TABLE I

QUERY EXAMPLE

| | |
|---|---|
| 001 | <?xml version="1.0"?> |
| 002 | <!--Query string representation: (FirstName = "Mary" AND LastName = |
| 003 | "McGoon") OR State = "NC"--> |
| 004 | <QueryAbstraction> |
| 005 |    <Selection> |
| 006 |       <Condition internalID="4"> |
| 007 |          <Condition field="FirstName" operator="EQ" value="Mary" |
| 008 | internalID="1"/> |
| 009 |          <Condition field="LastName" operator="EQ" value="McGoon" |
| 010 | internalID="3" relOperator="AND"></Condition> |
| 011 |       </Condition> |
| 012 |       <Condition field="State" operator="EQ" value="NC" internalID="2" |
| 013 | relOperator="OR"></Condition> |
| 014 |    </Selection> |
| 015 |    <Results> |
| 016 |       <Field name="FirstName"/> |
| 017 |       <Field name="LastName"/> |
| 018 |       <Field name="State"/> |
| 019 |    </Results> |
| 020 | </QueryAbstraction> |

Illustratively, the abstract query shown in Table I includes a selection specification (lines 005-014) containing selection criteria and a results specification (lines 015-019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative instance of a data repository abstraction component 148 corresponding to the abstract query in Table I is shown in Table II below. By way of illustration, the data repository abstraction component 148 is defined using XML. However, any other language may be used to advantage.

TABLE II

DATA REPOSITORY ABSTRACTION EXAMPLE

| | |
|---|---|
| 001 | <?xml version="1.0"?> |
| 002 | <DataRepository> |
| 003 |    <Category name="Demographic"> |
| 004 |       <Field queryable="Yes" name="FirstName" displayable="Yes"> |
| 005 |          <AccessMethod> |
| 006 |             <Simple columnName="f_name" tableName="contact"></Simple> |
| 007 |          </AccessMethod> |
| 008 |          <Type baseType="char"></Type> |
| 009 |       </Field> |
| 010 |       <Field queryable="Yes" name="LastName" displayable="Yes"> |
| 011 |          <AccessMethod> |
| 012 |             <Simple columnName="l_name" tableName="contact"></Simple> |
| 013 |          </AccessMethod> |
| 014 |          <Type baseType="char"></Type> |
| 015 |       </Field> |
| 016 |       <Field queryable="Yes" name="State" displayable="Yes"> |
| 017 |          <AccessMethod> |
| 018 |             <Simple columnName="state" tableName="contact"></Simple> |
| 019 |          </AccessMethod> |
| 020 |          <Type baseType="char"></Type> |

TABLE II-continued

DATA REPOSITORY ABSTRACTION EXAMPLE

| 021 | </Field> |
| 022 | </Category> |
| 023 | </DataRepository> |

Note that lines 004-009 correspond to the first field specification $208_1$ of the DRA 148 shown in FIG. 2B and lines 010-015 correspond to the second field specification $208_2$. For brevity, the other field specifications defined in Table I have not been shown in FIG. 2B. Note also that Table I illustrates a category, in this case "Demographic". A category is a grouping of one or more logical fields. In the present example, "First Name", "Last Name" and "State" are logical fields belonging to the common category, "Demographic".

Figure 3:
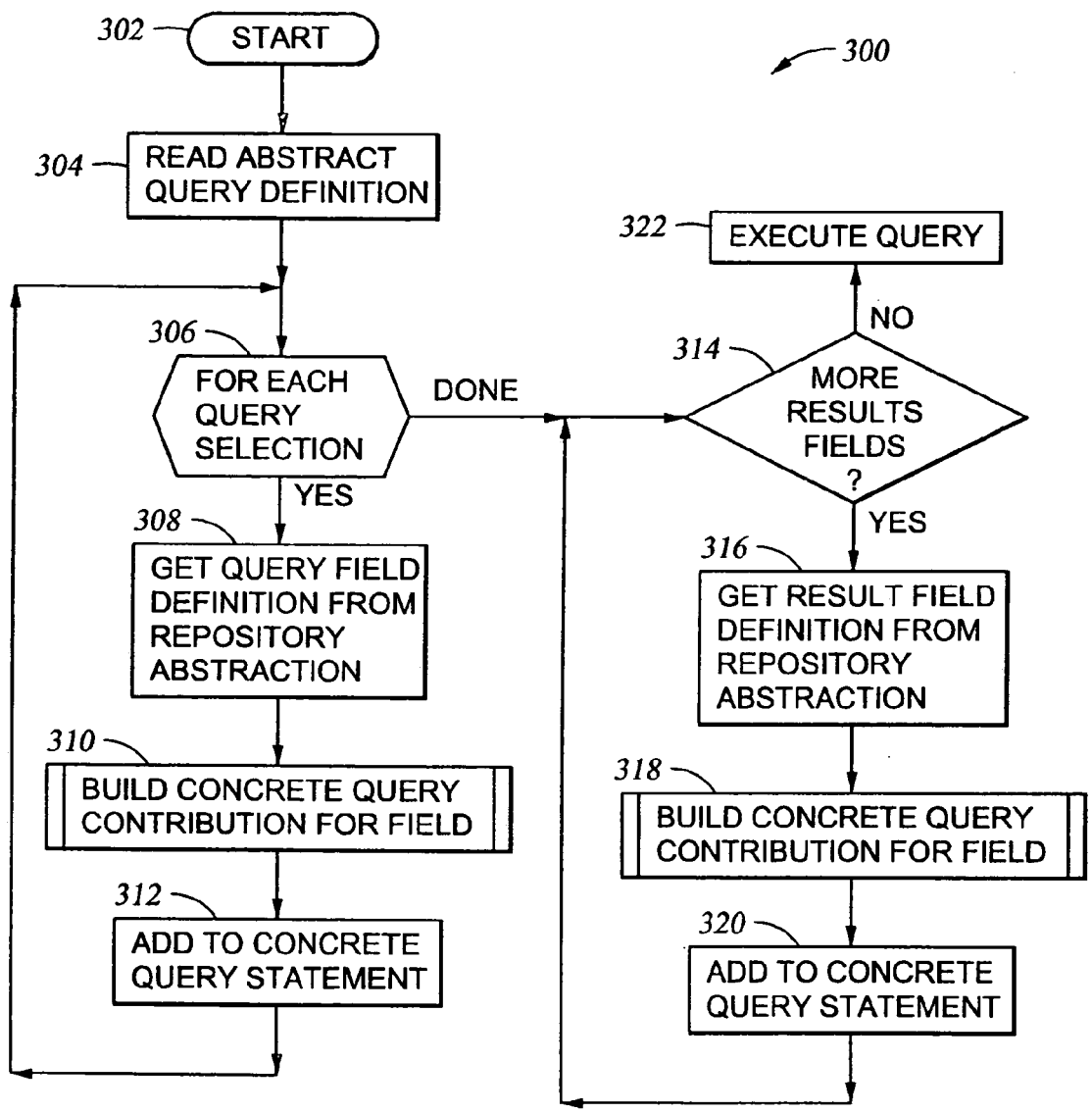
FIG. 3 is a flow chart illustrating the operation of a runtime component.

FIG. 3 shows an illustrative runtime method 300 exemplifying one embodiment of the operation of the runtime component 150. The method 300 is entered at step 302 when the runtime component 150 receives as input an instance of an abstract query (such as the abstract query 202 shown in FIG. 2). At step 304, the runtime component 150 reads and parses the instance of the abstract query and locates individual selection criteria and desired result fields. At step 306, the runtime component 150 enters a loop (comprising steps 306, 308, 310 and 312) for processing each query selection criteria statement present in the abstract query, thereby building a data selection portion of a Concrete Query. In one embodiment, a selection criterion consists of a field name (for a logical field), a comparison operator (=, >, <, etc) and a value expression (what is the field being compared to). At step 308, the runtime component 150 uses the field name from a selection criterion of the abstract query to look up the definition of the field in the data repository abstraction 148. As noted above, the field definition includes a definition of the access method used to access the physical data associated with the field. The runtime component 150 then builds (step 310) a Concrete Query Contribution for the logical field being processed. As defined herein, a Concrete Query Contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from a physical data repository, represented by the databases 156-157 shown in FIG. 1. The Concrete Query Contribution generated for the current field is then added to a Concrete Query Statement. The method 300 then returns to step 306 to begin processing for the next field of the abstract query. Accordingly, the process entered at step 306 is iterated for each data selection field in the abstract query, thereby contributing additional content to the eventual query to be performed.

After building the data selection portion of the concrete query, the runtime component 150 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 300 enters a loop at step 314 (defined by steps 314, 316, 318 and 320) to add result field definitions to the concrete query being generated. At step 316, the runtime component 150 looks up a result field name (from the result specification of the abstract query) in the data repository abstraction 148 and then retrieves a Result Field Definition from the data repository abstraction 148 to identify the physical location of data to be returned for the current logical result field. The runtime component 150 then builds (as step 318) a Concrete Query Contribution (of the concrete query that identifies physical location of data to be returned) for the logical result field. At step 320, Concrete Query Contribution is then added to the Concrete Query Statement. Once each of the result specifications in the abstract query has been processed, the query is executed at step 322.

Figure 4:
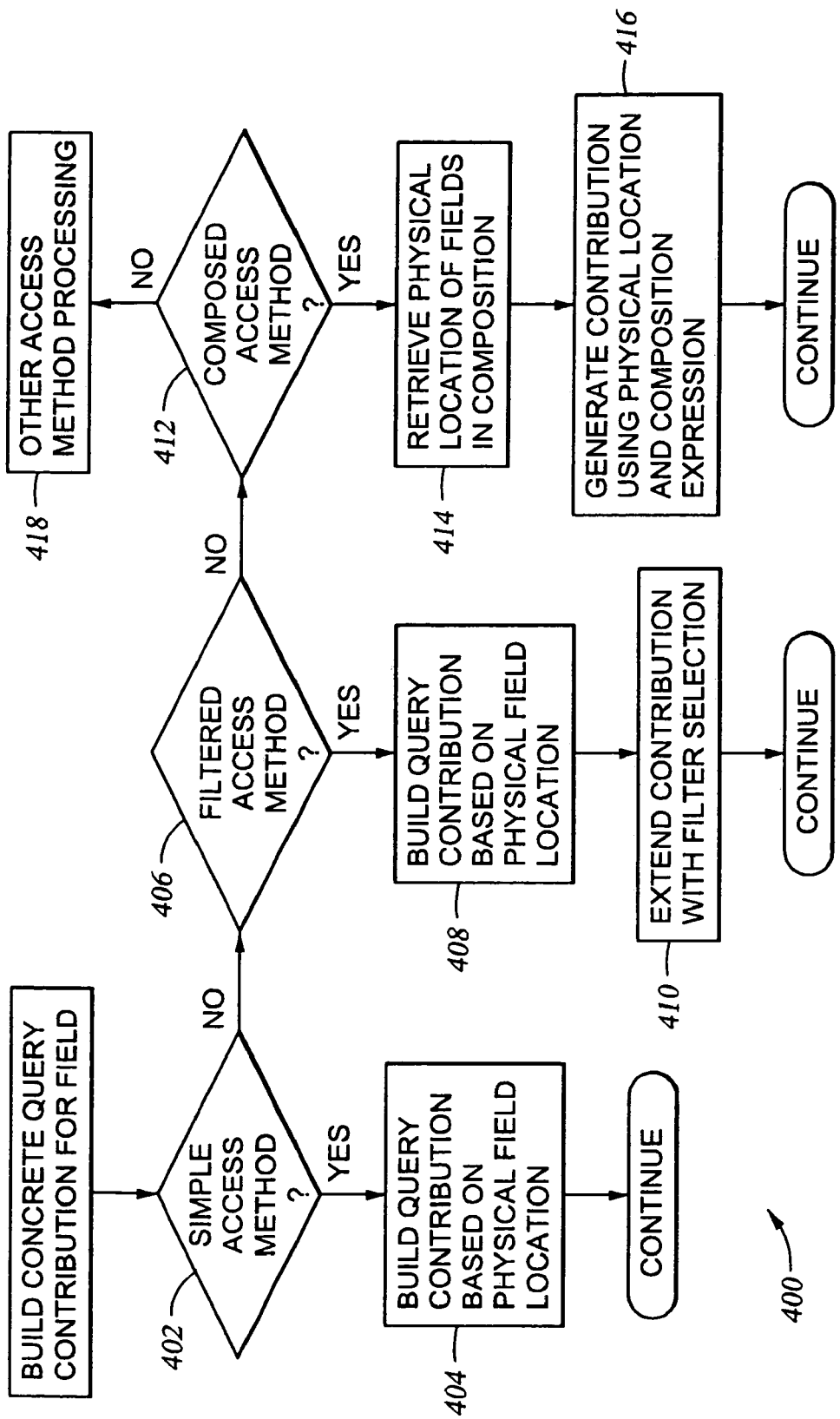
FIG. 4 is a flow chart illustrating the operation of a runtime component.

One embodiment of a method 400 for building a Concrete Query Contribution for a logical field according to steps 310 and 318 is described with reference to FIG. 4. At step 402, the method 400 queries whether the access method associated with the current logical field is a simple access method. If so, the Concrete Query Contribution is built (step 404) based on physical data location information and processing then continues according to method 300 described above. Otherwise, processing continues to step 406 to query whether the access method associated with the current logical field is a filtered access method. If so, the Concrete Query Contribution is built (step 408) based on physical data location information for some physical data entity. At step 410, the Concrete Query Contribution is extended with additional logic (filter selection) used to subset data associated with the physical data entity. Processing then continues according to method 300 described above.

If the access method is not a filtered access method, processing proceeds from step 406 to step 412 where the method 400 queries whether the access method is a composed access method. If the access method is a composed access method, the physical data location for each sub-field reference in the composed field expression is located and retrieved at step 414. At step 416, the physical field location information of the composed field expression is substituted for the logical field references of the composed field expression, whereby the Concrete Query Contribution is generated. Processing then continues according to method 300 described above.

If the access method is not a composed access method, processing proceeds from step 412 to step 418. Step 418 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a Concrete Query Contribution for a logical field according to the method 400. For example, the conversion may be performed as part of, or immediately following, the steps 404, 408 and 416. A subsequent conversion from the format of the physical data to the format of the logical field is performed after the query is executed at step 322. Of course, if the format of the logical field definition is the same as the underlying physical data, no conversion is necessary.

Other Embodiments of Data Repository Abstraction Components

In one embodiment, a different single data repository abstraction component 148 is provided for each separate physical data representation 214. In an alternative embodiment, a single data repository abstraction component 148 contains field specifications (with associated access methods) for two or more physical data representations 214. In yet another embodiment, multiple data repository abstraction components 148 are provided, where each data repository abstraction component 148 exposes different portions of the same underlying physical data (which may comprise one or more physical data representations 214). In this manner, a single application 140 may be used simultaneously by multiple users to access the same underlying data where the particular portions of the underlying data exposed to the application are determined by the respective data repository abstraction component 148. This latter embodiment is described in more detail in U.S. patent application Ser. No. 10/132,228, entitled "DYNAMIC END USER SPECIFIC CUSTOMIZATION OF AN APPLICATION'S PHYSICAL DATA LAYER THROUGH A DATA REPOSITORY ABSTRACTION LAYER" and assigned to International Business Machines, Inc.

In any case, a data repository abstraction component 148 contains (or refers to) at least one access method which maps a logical field to physical data. To this end, as illustrated in the foregoing embodiments, the access methods describe a means to locate and manipulate the physical representation of data that corresponds to a logical field. In one embodiment, the access methods are further configured with a location specification defining a location of the data associated with the logical field. In this way, the data repository abstraction component 148 is extended to include description of a multiplicity of data sources that can be local and/or distributed across a network environment. The data sources can be using a multitude of different data representations and data access techniques. In this manner, an infrastructure is provided which is capable of capitalizing on the distributed environments prevalent today. One approach for accessing a multiplicity of data sources is described in more detail in U.S. patent application Ser. No. 10/131,984, entitled "REMOTE DATA ACCESS AND INTEGRATION OF DISTRIBUTED DATA SOURCES THROUGH DATA SCHEMA AND QUERY ABSTRACTION" and assigned to International Business Machines, Inc.

In various embodiments, numerous advantages over the prior art are provided. In one aspect, advantages are achieved by defining a loose coupling between the application query specification and the underlying data representation. Rather than encoding an application with specific table, column and relationship information, as is the case where SQL is used, the application defines data query requirements in a more abstract fashion that are then bound to a particular physical data representation at runtime. The loose query-data coupling of the present invention enables requesting entities (e.g., applications) to function even if the underlying data representation is modified or if the requesting entity is to be used with a completely new physical data representation than that used when the requesting entity was developed. In the case with a given physical data representation is modified or restructured, the corresponding data repository abstraction is updated to reflect changes made to the underlying physical data model. The same set of logical fields are available for use by queries, and have merely been bound to different entities or locations in physical data model. As a result, requesting entities written to the abstract query interface continue to function unchanged, even though the corresponding physical data model has undergone significant change. In the event a requesting entity is to be used with a completely new physical data representation different than that used when the requesting entity was developed, the new physical data model may be implemented using the same technology (e.g., relational database) but following a different strategy for naming and organizing information (e.g., a different schema). The new schema will contain information that may be mapped to the set of logical fields required by the application using simple, filtered and composed field access method techniques. Alternatively, the new physical representation may use an alternate technology for representing similar information (e.g., use of an XML based data repository versus a relational database system). In either case, existing requesting entities written to use the abstract query interface can easily migrate to use the new physical data representation with the provision of an alternate data repository abstraction which maps fields referenced in the query with the location and physical representation in the new physical data model.

In another aspect, the ease-of-use for the application builder and the end-user is facilitated. Use of an abstraction layer to represent logical fields in an underlying data repository enables an application developer to focus on key application data requirements without concern for the details of the underlying data representation. As a result, higher productivity and reduced error rates are achieved during application development. With regard to the end user, the data repository abstraction provides a data filtering mechanism, exposing pertinent data and hiding nonessential content that is not needed by a particular class end-user developing the given query.

Solutions implementing the present model use the provided abstract query specification to describe its information requirements, without regard for the location or representation of the data involved. Queries are submitted to the runtime component which uses the data repository abstraction component to determine the location and method used to access each logical piece of information represented in the query. In one embodiment, the runtime component also includes the aforementioned data caching function to access the data cache.

In one aspect, this model allows solutions to be developed independent of the physical location or representation of the data used by the solution, making it possible to easily deploy the solution to a number of different data topologies and allowing the solution to function in cases where data is relocated or reorganized over time. In another aspect, this approach also simplifies the task of extending a solution to take advantage of additional information. Extensions are made at the abstract query level and do not require addition of software that is unique for the location or representation of the new data being accessed. This method provides a common data access method for software applications that is independent of the particular method used to access data and of the location of each item of data that is referenced. The physical data accessed via an abstract query may be represented relationally (in an existing relational database system), hierarchically (as XML) or in some other physical data representation model. A multitude of data access methods are also supported, including those based on existing data query methods such as SQL and XQuery and methods involving programmatic access to information such as retrieval of data through a Web Service invocation (e.g., using SOAP) or HTTP request.

Model Entities

Aspects of the present invention provide data abstraction model entities that serve to identify a higher level abstraction of the underlying data by representing a composite of individual logical fields. Model entities provide end users and applications a higher level conceptual view of the underlying data that can simplify data query and modification tasks (i.e., insert and deletion). Rather than having to understand all of the individual fields that make up entities such as a patient or a lab test result, the user/application can work at the more conceptual model entity level. As will be described below in more detail, the definition of a model entity contains sufficient metadata to streamline and simplify transactions performed against instances of a model entity.

In the current embodiment, model entities are defined via additional metadata to that already found in an abstract data model representation (i.e., the DRA). More generally, however, model entities can be defined within an abstract data model definition or could be defined external to an abstract data model definition.

Further, embodiments are described with reference to relational databases. However, the invention is applicable to any other data representation including, for example, markup languages such as XML.

Figure 5:
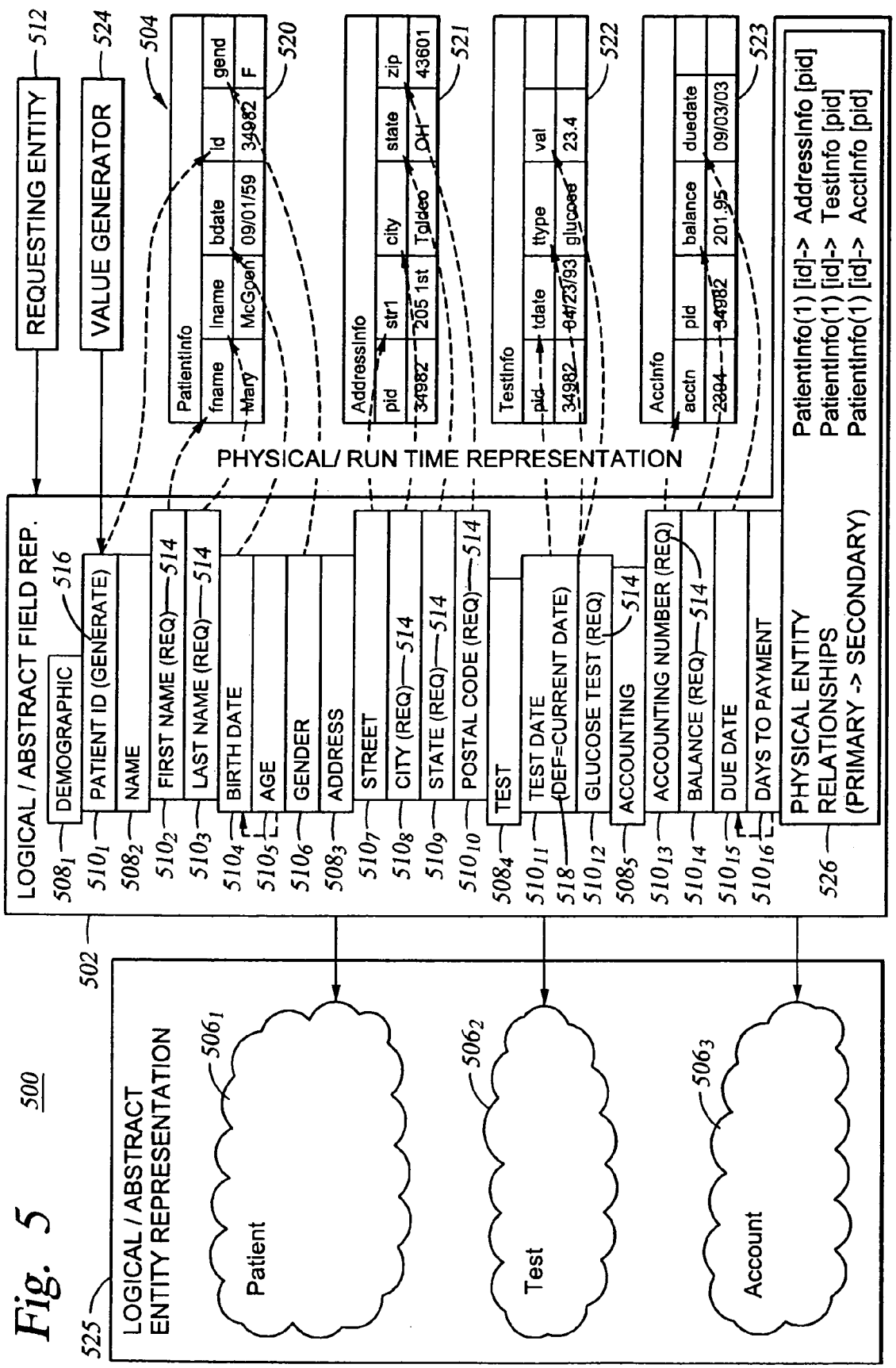
FIG. 5 is a view of an abstraction layer defining model entities having physical counterparts in a physical data source.

Referring now to FIG. 5, an environment 500 includes a representative data repository abstraction component (DRA) 502 configured to support accesses (i.e., queries and modification operations) of a physical data source. By way of illustration only, the physical data source being accessed via the data repository abstraction component 502 is a relational data source 504 containing a plurality of tables 520-523. However, as described above, any data type is contemplated.

The data repository abstraction component 502 generally includes a plurality of categories $508_{1-5}$, a plurality of logical fields specifications $510_{1-16}$, a model entity specification 525 and a physical entity relationship specification 526. The categories 508 may be defined for a single logical field or, more commonly, relate two or more logical field specifications 510. The logical fields specifications 510 includes the metadata described above with respect to FIG. 2, which is not shown for simplicity. Some aspects of the logical fields specifications described above with respect to FIG. 2 are shown in a simplified form. For example, reference to logical fields used in defining composed fields is represented by arrows, such as in the case of the "Age" logical field specification $510_5$ and the "Days to Payment" logical field specification $510_{16}$.

In addition, logical fields specifications 510 include supplemental metadata used to implement aspects of the invention. For example, selected logical fields are configured with various attributes including a "required" attribute 514, a "generate" attribute 516 and a "default" attribute 518. Illustratively, the "First Name" logical field specification $510_2$, the "Last Name" logical field specification $510_3$, the "City" logical field specification $510_8$, the "State" logical field specification $510_9$, the "Postal Code" logical field specification $510_{10}$, the "Glucose Test" logical field specification $510_{12}$, the "Account Number" logical field specification $510_{13}$ and the "Balance" logical field specification $510_{14}$ are configured with the "Required" attribute 514. The "Patient ID" logical field specification $510_1$ is configured with the "Generate" attribute 516 and the Test Date logical field specification $510_{11}$ is configured with the "Default Value" attribute 518, where the default value is specified as "Current_Date".

The model entity specification 525 defines a plurality of model entities $506_{1-3}$ (illustratively three are shown; however, any number of model entities may be defined). Each model entity has a name. Illustratively, a "Patient" model entity $506_1$, a "Test" model entity $506_2$ and an "Account" model entity $506_3$ are defined by the DRA 502.

Figure 6:
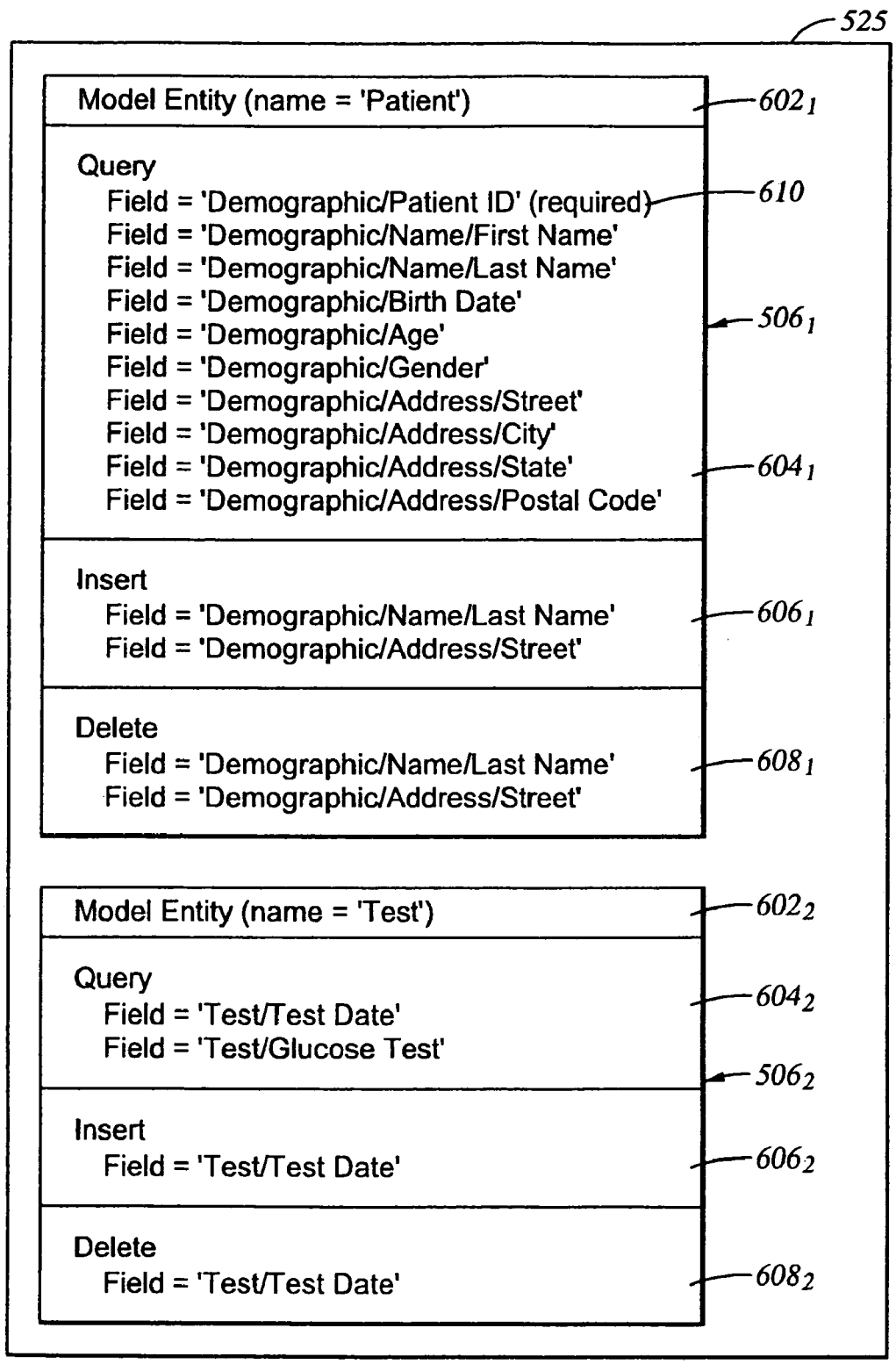
FIG. 6 is an illustrative model entity specification for a Patient entity and a Test entity.

By way of illustration, additional details of the Patient and Test model entities $506_{1-2}$ are now described with reference to FIG. 6. Although not shown, the details of the "Account" model entity $506_3$ may have a similar composition. In addition to a name 602, each model entity defines multiple sets of fields used to implement query, insert and delete operations against the physical data corresponding to the model entity. Specifically, each model entity 506 is partitioned to include a query portion $604_{1-2}$, the insert portion $606_{1-2}$ and a delete portion $608_{1-2}$. The appropriate portion is accessed according to the type of operation being run against the model entity 506. Note that for queries, the full complement of fields defining a model entity (e.g., Patient) is specified, while in the case of inserts and deletes a subset of all the fields defining the model entity is specified. As will be described in more detail below, the subset of fields include a "seed" field for each corresponding physical entity of a model entity. In any case, it should be clear that a portion of a model entity 506 may include only a single logical field pointing to a single physical entity. Further, a model entity 506 may itself only have a single logical field pointing to a single physical entity. The model entities provide a particular advantage, however, when they span multiple fields/entities since in this case users are able to work with a singular abstract representation rather than being burdened with knowing what logical fields make up an abstract entity. In this regard, it is noted that, in practice, each portion (query, insert and delete) of a model entity 506 is itself a model entity in that the portions each define an abstract entity for a given operation, whether the abstract entity spans multiple logical fields and/or multiple physical fields.

In addition to the model entity metadata, aspects of the invention are implemented by the physical entity relationships specification 526, which is now described with reference to FIG. 5. The physical entity relationships specification 526 defines the hierarchical relationships between entities in a physical model (i.e., the relational database 520). By way of illustration, the physical entity relationships specification 526 shown in FIG. 5 relates the patient information table 520 to each of the other tables 521-523 in the data source 504. In each case, the patient information table 520 is primary with respect to a secondary table. Although not illustrated in the physical entity relationships specification 526 of FIG. 5, it is contemplated that additional levels of hierarchy may be defined. For example, the address information table 521 may be defined as a primary entity with respect to some other secondary table (referred to for convenience as "Table A") not shown in FIG. 5. In this case, a three-tiered hierarchy is defined in which the patient information table 520 is the primary entity, the address information table 521 is the secondary entity, and Table A is the tertiary entity. In such an arrangement, the patient information table 520 and the address information table 521, and the address information table 521 and Table A are explicitly in a primary-secondary relationship, and by syllogism, the patient information table 520 and Table A are in a primary-secondary relationship.

The physical entity relationships specification 526 also indicates the basis for a primary-secondary relationship between entities. Specifically, the field (i.e., column) on which the relationship is based is specified in brackets [ ]. In the present illustration, the entity relationships are defined for the patient identifier ("ID" and "PID", respectively). Although only one field name is shown specified for each entity, two or more may be specified such that each entity is related by two or more pairs of fields. Consider the following example of a relationship: Entity 1 [field 1, field 3, field 6]→Entity 2 [field 2, field 3, field 4]. In this example, the fields 1, 3 and 6 of the primary entity, Entity 1, are related to fields 2, 3 and 4, respectively, of the secondary entity, Entity 2.

The physical entity relationships specification 526 also specifies whether a relationship between two entities is one-to-one, one-to-many many-to-one or many-to-many. This relationship is specified in parentheses ( ) for each entity. For example, the entities "PatientInfo" and "AddressInfo" are in a one-to-one relationship, while the entities "PatientInfo" and "TestInfo" are in a one-to-many relationship.

The DRA 502 allows a requesting entity 512 (e.g., application 140 of FIG. 1) to access the data source 504 by issuing a request for results from the data source 504 or by issuing a request to modify data in the data source 504. Generally, both of these requests may be referred to as "queries". However, for convenience, only a request for results will be referred to as a query in the following description.

Query Operations Using Model Entities

In the case of query operations, a set of fields defined by the model entity 506 in the query portion 604 serves a variety of purposes. First, the query portion 604 specifies those fields that are required output from queries involving the model entity. Required fields for query results are identified in the query portion of the model entity by a "required" attribute. For example, the "patient" model entity $506_1$ defines "patient id" as a required field with the provision of a required attribute 610 in the query portion 604, thereby ensuring that all query results for patients will include patient id.

As an example of how the required attribute 610 is applied, consider the initial Abstract Query 700 shown in FIG. 7. The Abstract Query 700 represents the initial form of an abstract query as specified by a user, for example. Note the explicit reference 702 to the "Patient" model entity $506_1$. As a result of this reference, the logic of the DRA 502, specifically the metadata of the Patient model entity $506_1$, is applied to convert the initial Abstract Query 700 into an effective Abstract Query 704. In this case, "Patient ID" was added to the result fields specified in the effective Abstract Query 704 because the "patient" model entity $506_1$ defines "Patient id" as a required field with the provision of a required attribute 610.

The augmentation of the effective Abstract Query 704 from an end-user's perspective is described with reference to FIGS. 8-12, which show a series of user interface screens. Referring first to FIG. 8, a screen 800 is configured with a selection menu 802 from which a user selects a query focus. Each of the available selections corresponds to one of the defined model entities 506. Illustratively, the user selects "Patient" as the query focus and clicks the "Next" button 804, which causes the user interface to display the next screen 900 shown in FIG. 9. That is, the user has elected to craft a query which invokes the "Patient" model entity $506_1$. The user then specifies various query conditions in an input field 1002 as shown in FIG. 10. Clicking the "Next" button 1004 causes the user interface to display the next screen 1100 shown in FIG. 11. The screen 1100 includes a Result Fields input field 1102. Illustratively, the input field 1102 is primed with the "Patient ID" field. That is, the "Patient ID" field is automatically added to the Result Fields input field 1102 because the "Patient" model entity $506_1$ defines "Patient ID" as a required field with the provision of a required attribute 610 (shown in FIG. 6). The user may then specify additional result fields as shown in FIG. 12. In an alternative embodiment, the "Patient ID" is not added to the result fields of the query until submitted for execution by the user.

Figure 13:
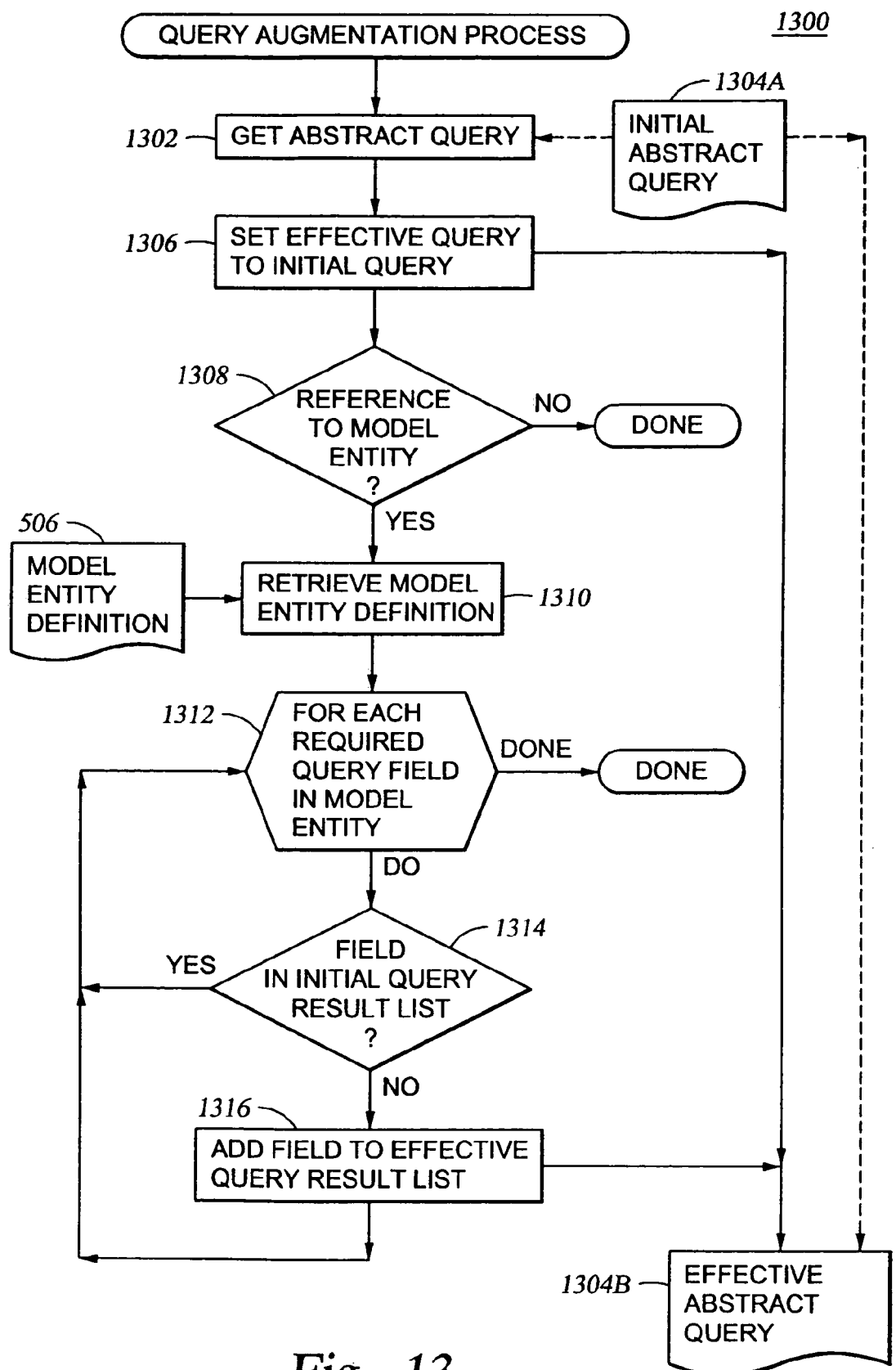
FIG. 13 is a flow chart for augmenting query result fields according to a specified model entity.

Referring now to FIG. 13, one embodiment of a method 1300 illustrating the result field augmentation of a query is described. The augmentation process begins with receipt of an initial abstract query 1304A (step 1302), such as the initial Abstract Query 700 described with reference to FIG. 7. An effective query 1304B (such as the effective Abstract Query 704 described with reference to FIG. 7) is then set to the initial query 1304A (step 1306). At this point, the composition of the effective abstract query 1304B is the same as the initial abstract query 1304A. The effective abstract query is then examined for a reference to a model entity (step 1308). In the absence of such a reference, processing is complete and the method 1300 exits. If, however, the effective abstract query 1304B includes a reference to a model entity the appropriate model entity definition 506 is retrieved from the data repository abstraction component 502. For each required query field (indicated by the required attribute 610) in the model entity (loop entered at step 1312), the method 1300 determines whether the required field is already specified as a result field in the initial abstract query 1304A (step 1314). If not, the required field is added to the result fields of the effective abstract query 1304B.

In another aspect, model entities establish a focal point within the data environment that can be used to implement the appropriate logic needed to correlate information that spans multiple entities (e.g. tables) in the underlying physical data repository. From this focal point, a direction to interpret relationships between tables can be established. For example, the physical entity relationships specification 526 describes a 1-to-many relationship between the PatientInfo table 520 and the TestInfo table 521, since each patient can have multiple lab test results. A model entity focused on the patient entity would establish a point of reference to correlate patient information with lab test results. For example, in the case of a relational database, the model entity for "patient" would be used to determine optimal table join logic. Since each patient can have multiple lab test results, a query looking for patients with multiple test results would join the lab test table multiple times to enable selection of patients with all of the desired test results. However, a model entity focused on lab tests would only join the patient information table once since the focus is on lab tests and the relationship in the direction "lab test"-to-"patient information" is degree one (1).

The effect of a model entity on query construction can be illustrated with respect to FIG. 14. An illustrative abstract query 1400 includes a plurality of query conditions 1402, result fields 1404 and a reference 1406 to a model entity, in this case "Patient". That is, the "Patient" model entity $506_1$ is specified as the focal point of the query 1400. The query conditions 1402 include two conditions with respect to a Glucose Test, where the two conditions are logically ANDed together. Since the "Patient" entity is the focus, the query conditions 1402 are interpreted to mean "find patients having both a glucose test value=5 AND a glucose test value=10". Further, the relationship defined in the physical entity relationships specification 526 between the "PatientInfo" table 520 and the "TestInfo" table 521 is one-to-many, indicating that a patient can have more than one test result. Given this information, it is determined that a physical query 1408 (illustratively an SQL query) corresponding to the abstract query 1400 will require two instances of the "TestInfo" table 521 in order to compare two test results for the same patient. The two instances of the "TestInfo" table 521 are identified as T2 and T3 in the selection clause of the physical query 1408. Further, the physical entity relationships specification 526 is used to generate the necessary correlation logic 1410 between each physical entity involved in the query. In a relational model, the correlation logic is join logic specifying how tables are joined.

Figure 15:
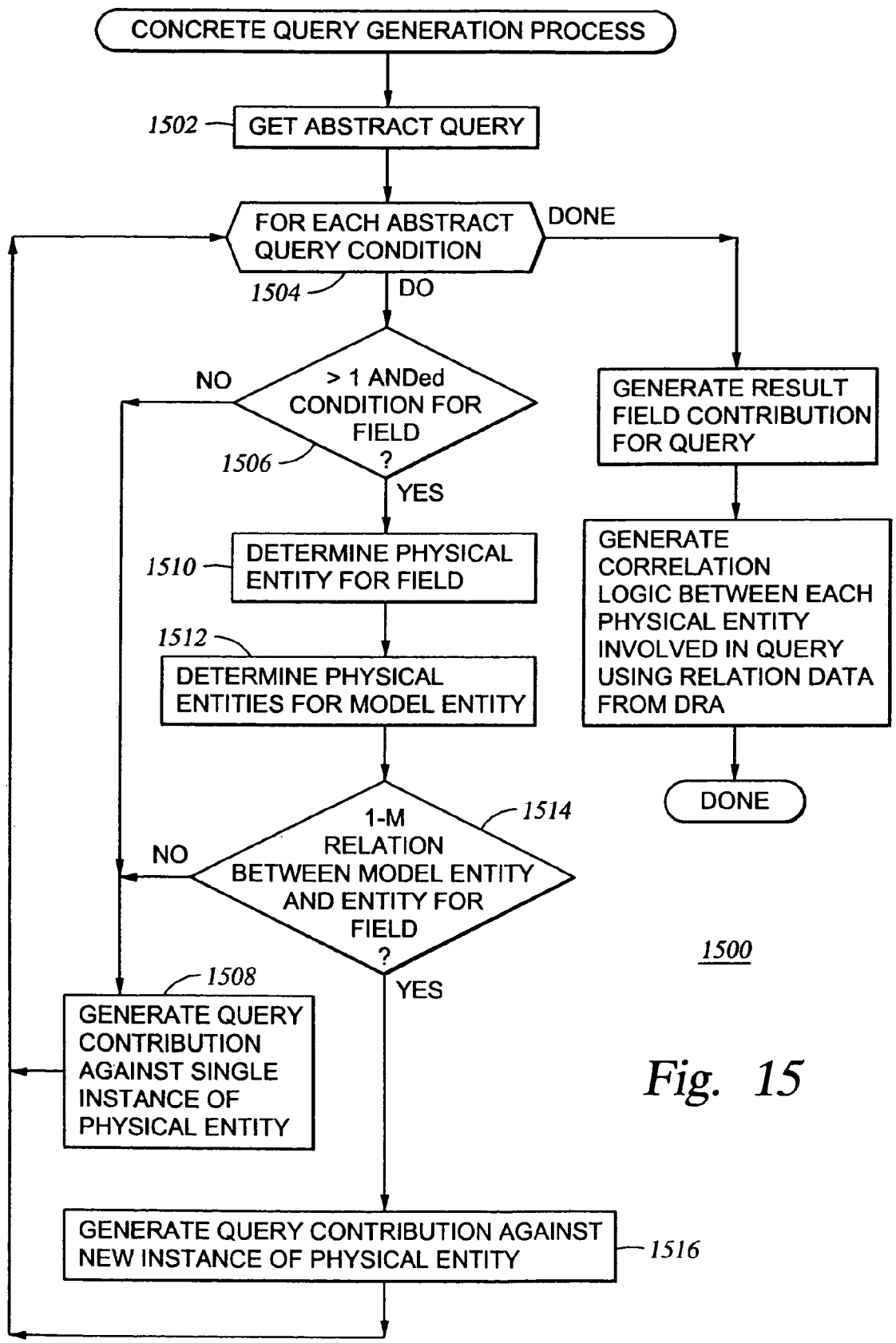
FIG. 15 is a flow chart of a method for generating a physical query based on the specification of a model entity.

Referring now to FIG. 15, a physical query generation process 1500 is described for generating a physical query based on abstract query reference in a model entity. The process 1500 is initiated when a completed abstract query is received (step 1502). For each abstract query condition in the abstract query (step 1504), a series of steps is performed. Specifically, for a given abstract query condition, the process 1500 determines whether more than one ANDed condition is specified for the field of the given abstract query condition (step 1506). If not, a physical query contribution is generated against a single instance of the physical entity corresponding to the field of the given abstract query condition (step 1508). If, however, step 1506 is answered affirmatively, the physical entity corresponding to the field for the given abstract query condition is determined (step 1510). In addition, the physical entities corresponding to the specified model entity are determined (step 1512). The physical entity relationships specification 526 is then examined to determine whether a one-to-many relationship exists between any of the physical entities corresponding to the model entity and the physical entity for the field of the given abstract query condition. If not, a physical query contribution is generated against a single instance of the physical entity corresponding to the field of the given abstract query condition (step 1508). If, however, step 1514 is answered affirmatively, a physical query contribution is generated against another instance of the physical entity corresponding to the field of the given abstract query condition (step 1516).

After having processed each abstract query condition, the result fields contribution for the query is generated (step 1518). Finally, correlation logic between each physical entity involved in the query is generated using the relationship metadata contained in the physical entity relationships specification 526 (step 1520). The resulting physical query can then be executed.

In still another aspect, model entities 506 can be used to represent a set of query result fields. By abstracting groups of logical fields (and, hence, physical fields) applications and users are able to deal with higher level entities (e.g., a patient), without having to understand the details of what constitutes the entity.

Figure 16:
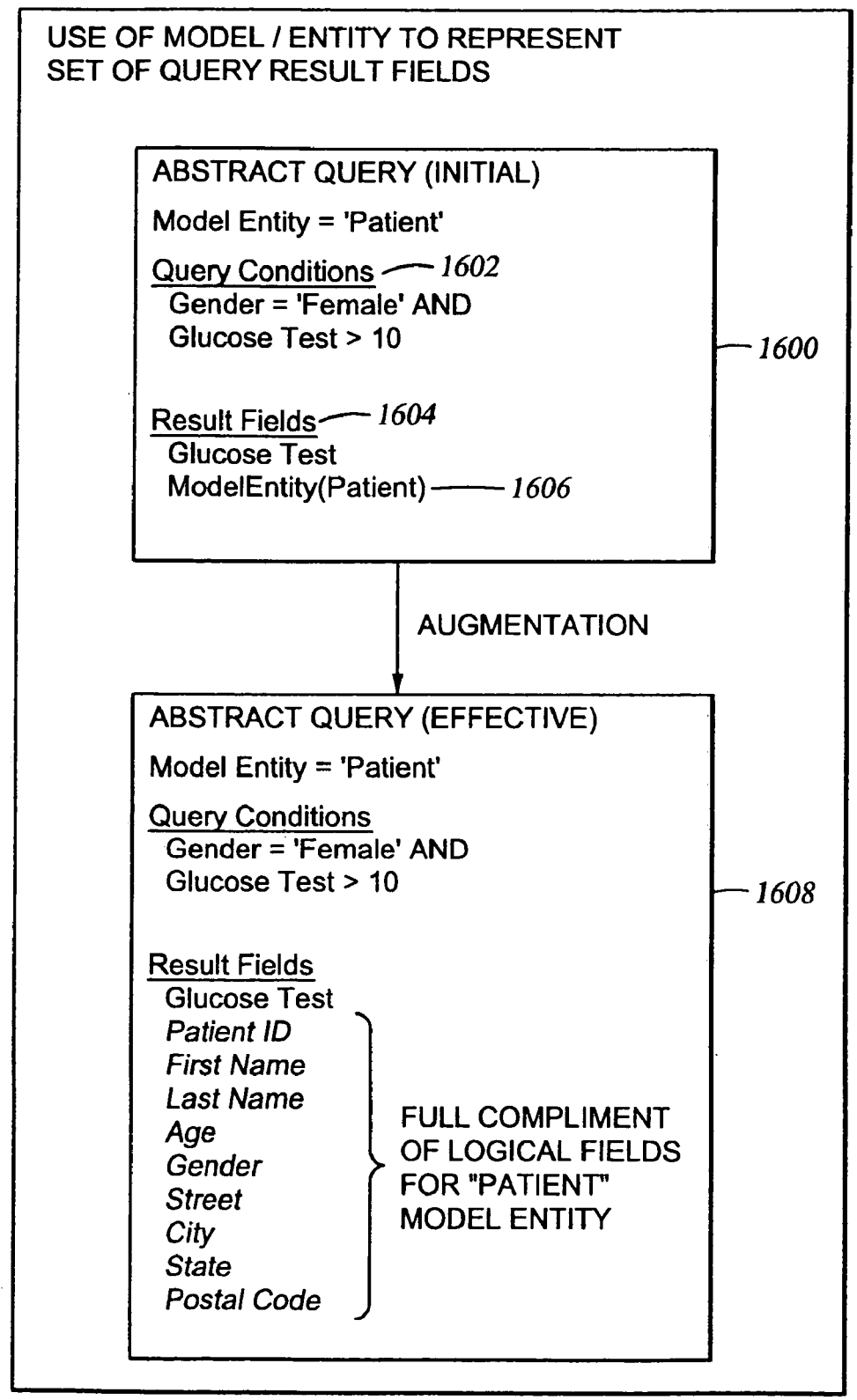
FIG. 16 illustrates the use of a model entity to represent a set of query result fields.

An illustration of using model entities to represent a set of query result fields is described with reference to FIG. 16. An initial Abstract Query 1600 is shown with illustrative query conditions 1602 and result fields 1604. In this example, the initial Abstract Query 1600 includes a reference 1604 to the "Patient" model entity $506_1$. As a result of this reference 1604, steps are taken to expand the result fields 1604 to include all of the logical fields defined for the "Patient" model entity $506_1$, resulting in the effective Abstract Query 1608.

Figure 17:
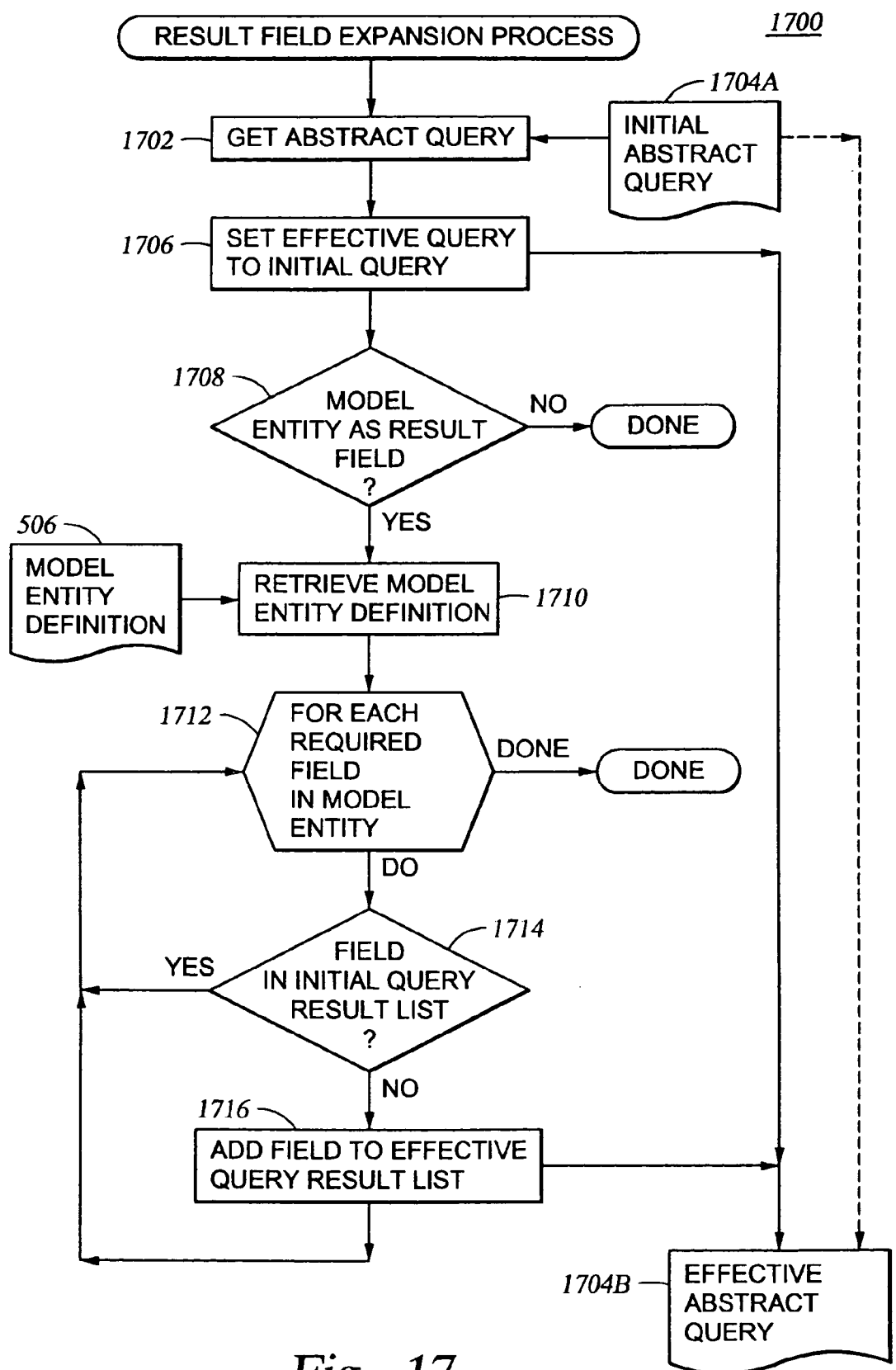
FIG. 17 is a flow chart of a method for expanding the result fields of an abstract query based on the specification of a model entity.

A result fields augmentation process 1700 is described with reference to FIG. 17. For a given an initial abstract query 1704A (step 1702), a corresponding effective query 1704B is set (step 1706). The result fields of the query 1704A are then examined to determine a reference to a model entity (step 1708). If no such reference is identified, the process 1700 is complete. If a model entity reference is present in the query, the model entity definition 506 is retrieved (step 1710). For each required field in the model entity (step 1712), the process 1700 determines whether the required field is in the specified result fields of the initial abstract query 1704A (step 1714). If not, the required field is added to the result fields of the effective abstract query 1704B (step 1716). At the conclusion of this processing for each required field, the effective abstract query 1704B includes the full complement of logical fields for the specified model entity definition 506.

It should be noted that the individual aspects separately described with reference to FIGS. 13, 15 and 17 (and related figures) may be used in combination. For example, assume that the initial Abstract Query 1400 shown in FIG. 14 does not include the "Patient id" field in the result fields 1404. A first stage of processing may be performed according to the method 1300 whereby the "Patient id" field is added to the result fields 1404. A second stage of processing is then performed according to the process 1500 to generate the physical query 1408. Persons skilled in the art will recognize other process combinations which may be performed.

Modification Operations Using Model Entities

Aspects of the invention are described above with reference to accessing data for the purpose of returning results. In the case of SQL, these are SELECTION operations. However, modification operations are also supported, including well-known modification operations such as INSERT and DELETE and the like. Accordingly, the following describes embodiments extending and enhancing the functionality of the abstract framework described above to support modification operations using model entities.

Since a model entity may span multiple physical entities (e.g., tables), multiple database operations may be needed to implement a modification operation. That is, embodiments are provided for modifying physical data via a single logical operation spanning multiple statements (e.g., multiple SQL statements) issued against the physical data. To this end, model entities define a minimal set of fields used to derive the complete set of fields involved in data insert and delete operations for an instance of the model entity. For example, patient information spans two tables (e.g., the "PatientInfo" table 520 and the "AddressInfo" table 521) in the relational data source 504 implementation shown in FIG. 5. To implement inserts and deletes, the model entity for patient identifies at least one field in each table to serve as a "seed" in determining the complete set of fields that are needed to insert a new patient into the database, as well as the complete set of tables that are involved to delete a patient from the database. Specifically, the seed fields are specified in insert portion $606_1$ and delete portions $608_1$ of the model entity definition $506_1$ for "Patient" in the DRA 502 shown in FIG. 6. In the case of the insert portion $606_1$, the seed field corresponding to the "PatientInfo" table 520 is "Last Name" and the seed field corresponding to the "AddressInfo" table 521 is "Street". Each model entity 506 defined in the DRA 502 may have a similar portions specifying seed fields.

Based on the seed fields, multiple physical operations are performed against the data repository to implement a single abstract operation. For inserting into a relational data source 504, for example, this would involve creation of multiple physical SQL INSERT statements for the tables involved. The application/user need only specify a model entity, which is then used to identify the corresponding physical entities and related logical fields involved in the modification operation. The model entity may be selected from a drop-down menu of an HTML form, for example. Further, deletes allow for conditions to be specified that can be used to target the changes required in the physical data repository.

Figure 18:
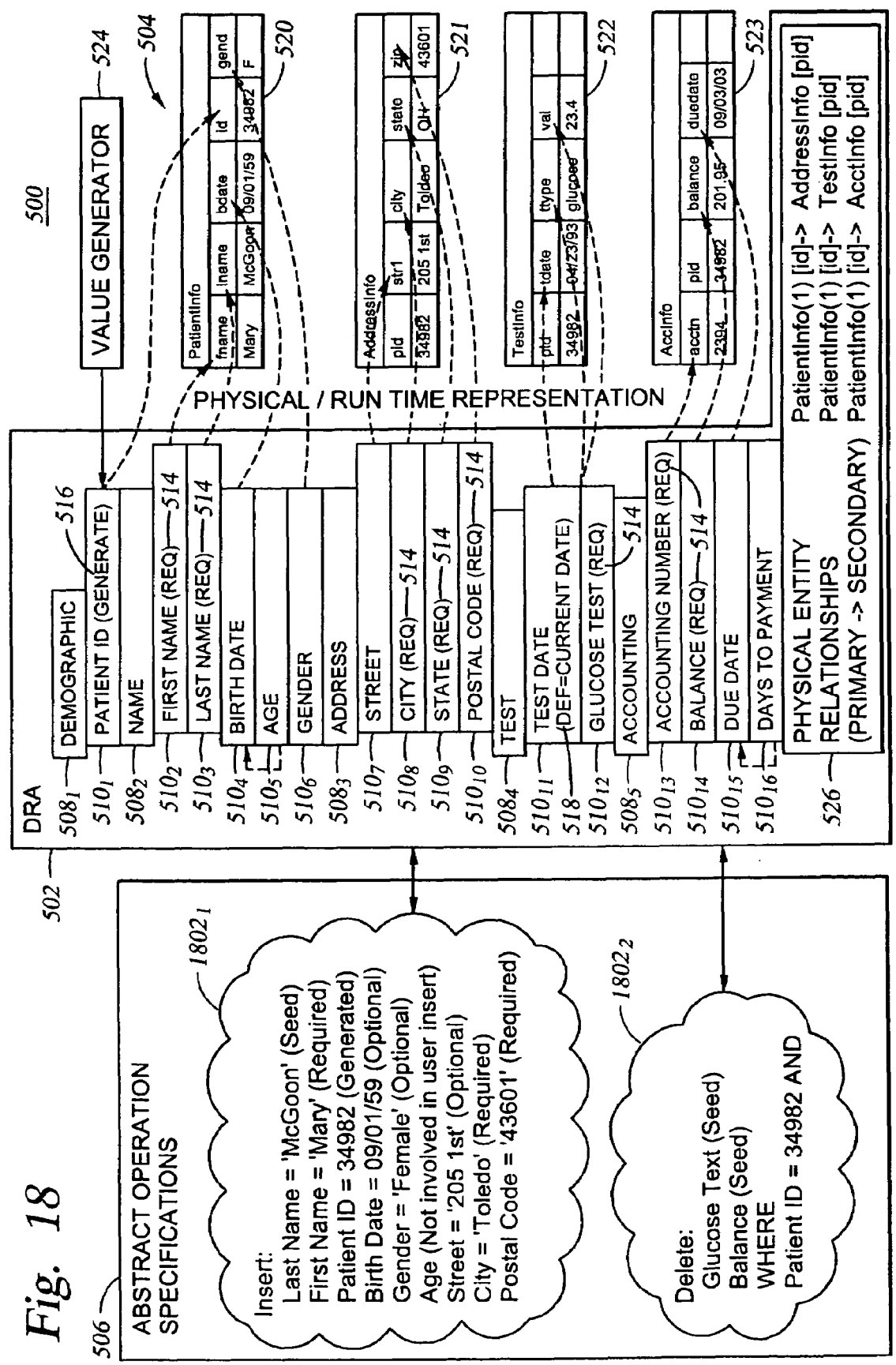
FIG. 18 is a simplified view of the environment shown in FIG. 5, and illustrating the modification of a data source by abstract modification operations constructed based on model entities

FIG. 18 shows a simplified view of the environment 500 and includes an illustrative abstract insert operation specification $1802_1$ and a delete operation specification $1802_2$ (collectively, abstract operation specifications 1802) used to implement an insert operation and a delete operation, respectively, against the relational data source 504. The abstract operation specifications 1802 are composed via the data repository abstraction component 502 according to specifications provided by a requesting entity 512 (e.g., a user/application). In each case, the abstract operation specifications 1802 specify a seed value for each affected physical entity. The seed values are retrieved from the appropriate portion of the model entity 506 selected by the requesting entity 512. Based on the seed values, related logical fields are determined and made a part of the abstract operation specifications 1802. Thus, as in the case of queries, the framework of the present application will provide the requesting entity 512 with the related fields according to the specified model entity 506, rather than requiring that knowledge about a database schema at the application level or end user. Values may then be supplied for each of the fields, either from the requesting entity 512 (e.g., a user) or from some other source such as the value generator 524.

Although in the present examples, each abstract operation includes two seed fields, an abstract operation may also be implemented with only a single seed field. For example, the seed field may be a primary key having an associated foreign key. In this case, an abstract operation specifying the seed field may affect the physical data on which the foreign key is defined. It should be noted that in some cases this result may not be desirable. That is, it may be undesirable to propagate changes based on primary key/foreign key relationships. If propagation is desired, only one statement directed to modifying the table containing the primary key is needed. The DBMS will handle modifications to the related tables. In some instances the DBMS may not support propagation, in which case multiple statements are needed. Although not shown the data repository abstraction component may include an attribute specifying whether propagation is desired or not for a given logical field.

In addition to seed fields, the DRA defines other field types used to implement modification operations. Generally, such fields may be required or optional. "Required" means that the requesting entity must supply a value for the field because there is no suitable default value, no algorithm to generate a value and the field cannot be null. Required fields are defined by the required attribute 514, shown in FIG. 5. An optional field is one which does not require specification of a value by the requesting entity. Optional fields include: 1) fields that can be assigned the value of NULL; 2) fields that have an algorithm that can be used to generate a value for that field (referred to herein as "generated fields"); and 3) fields that have a defined default value in the DRA (referred to herein as "default fields"). Generated field values are generated by a value generator 524 (i.e., an algorithm). Generated fields are defined by the generated attribute 516, shown in FIG. 5. Default values are used where no name/value pair was specified for a particular field related to the entity defined by a seed field. Default fields are defined by the default attribute 518. Default values may be statically defined or generated. As an example of a generated default value, the Test Date value in the illustrative abstract delete specification $506_3$ defaults to the current date. The requesting entity (e.g., user) may be given the option of supplying a different value.

As an example of required and optional fields, consider the logical fields corresponding to the patient entity. It was noted above that the patient entity is logically defined by the "Patient ID" logical field specification $510_1$, the "First Name" logical field specification $510_2$ and the "Last Name" logical field specification $510_3$. The "First Name" logical field specification $510_2$ and the "Last Name" logical field specification $510_3$ include the required attribute and are required fields. In contrast, the other logical fields defining the patient entity (i.e., birth date and gender) are optional.

Accordingly, inserts and updates to the data source 504 provide for identification of the actual fields (i.e. columns) that are to be modified along with the new value to be put in the data source. A set of name/value pairs represents the fields/values within the data repository abstraction component 502 that correspond to the physical fields/values to be modified. The name represents the abstract name for the logical field that is mapped via the data repository abstraction component 502 to its underlying physical representation. The value is the abstract value to be inserted or updated in the data source for that field. In one aspect, using an abstract data model (i.e., the data repository abstraction component 502) allows for automatic conversion of abstract values to the correct physical values to be inserted into the database. For example, the data repository abstraction component 502 can be defined to use values such as "Male" and "Female" for gender when the underlying physical data repository may use values of "F" and "M" to represent those values, as illustrated by the patient information table 520, which contains a record having the value "F" in the gender (gend) column. Input values for an insert operation take advantage of those abstract value specifications to provide further cushion for changes to the underlying physical representation of not only the structure of the underlying data repository, but also from the physical form of the data contained within the data repository.

Some situations require special considerations. In many cases, a logical field may be physically represented in multiple fields in a physical data repository. One example would be the case in the relational data source 504 where a column in one table was defined as a foreign key to a column in another database table. For example, a patient ID may be a primary key within the patient information table 520 and may also be defined as a foreign key within the test information table 522. Although this is a typical example, an abstract relationship between two fields does not necessarily have to be enforced by a physical relationship (such as primary/foreign key) in the underlying data repository. Using metadata about the relationship between the two physical locations (i.e., relationship between column(s) in a first table to column(s) in a second table), a single field within the abstract data representation can be used to handle both physical locations for the field. The application is shielded from the knowledge of the various places a particular value is used within the database schema.

Special considerations must be taken into account when these related fields are included on an insert or delete operation. When performing an insert operation, the runtime/DRA logic must recognize the various physical representations for the single abstract data field. The correct physical representation must be used based on the focus item of the insert operation. For example, if the patient identifier was represented as column "ID" in the patient information table 520 and as column "PID" in the test information table 522, the correct column name must be identified based on the table defined for the insert operation by the focus item. Additionally, these additional forms of the physical representation must be taken into account when determining default values and required values for the insert operation. For example, if the focus item identified that the underlying physical table for the operation was the test information table 522, the runtime/DRA logic must recognize that the abstract patient ID field ("PID") must be considered when looking for default and required values. That is, a new patient ID cannot be generated.

Additional considerations must be given to delete operations when dealing with abstract fields that represent multiple locations in the physical data repository to ensure that data integrity is maintained. The underlying data repository may enforce additional restrictions on these types of fields. Relational databases provide aspects such as restricting updates or deletes to columns defined with a primary key/foreign key relationship or cascading those updates and deletes through the foreign key tables. That is, a delete against a primary table such as the patient information table 520 could be set up to indicate that the delete should cascade and delete the corresponding rows from the test information table 522 based on the primary key/foreign key relationship based on patient ID. Using an abstract representation of the data repository, the implementation can choose whether to restrict these operations or attempt to propagate the changes through the various physical entities based on the definition of the relationships for the abstract field.

Since a modification based on specification of a model entity may involve multiple physical operations, the sequence in which the operations should be performed must also be considered. In the current data mining applications based on SQL, for example, the application is required to have the knowledge of order dependencies between operations. An aspect of the present invention decouples this knowledge from the application. In one embodiment, order dependencies between operations are specified in the physical entity relationships specification 526.

Figure 19:
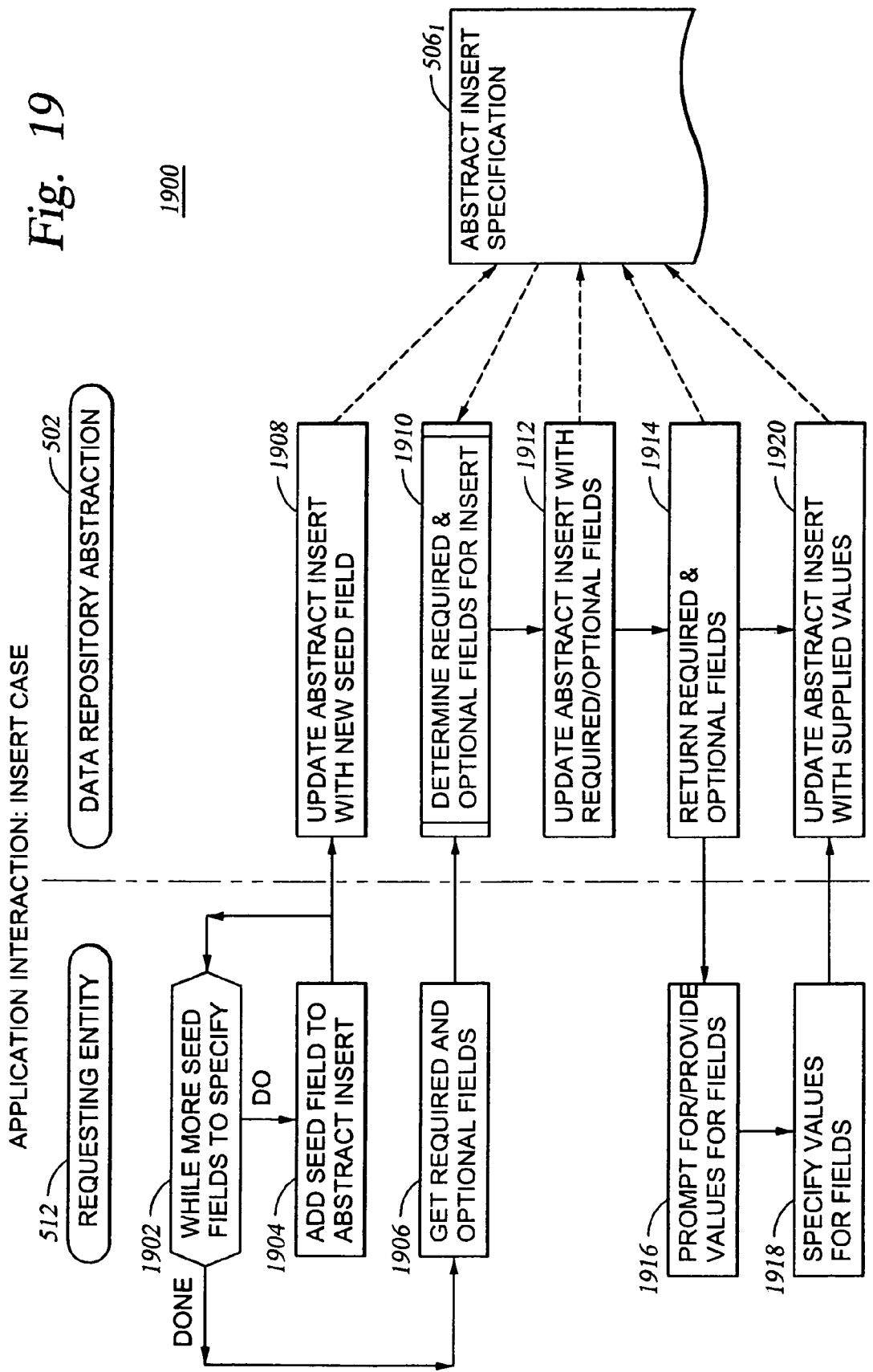
FIG. 19 is a flow chart illustrating the generation of an abstract insert specification used to implement an insert operation against physical data.

Referring now to FIG. 19, a method 1900 illustrates the interaction between requesting entity 512 and the data repository abstraction component 502 in the case of composing an abstract insert specification. For purposes of illustration it will be assumed that the requesting entity 512 is representative of the application 140 (FIG. 1), which receives input from a user via a user interface (e.g. the browser program 122 FIG. 1). Initially, the user selects a model entity (step 1902). The seed fields for the selected model entity are then determined and the abstract insert specification $2402_1$ is updated with the seed field (step 1906). Once each of the seed fields has been determined, the requesting entity 512 issues a request for the required and optional fields according to the specified seed fields (step 1908). The data repository abstraction component 502 is invoked to determine required and optional fields for the insert operation (step 1910). An illustrative representation of the processing occurring at step 1910 is described below with reference to FIG. 20. Having made the determination at step 2510, the abstract insert specification $2402_1$ is initialized with the required and optional fields (step 1912). The required and optional fields are then returned to the requesting entity (step 1914), which prompts the user to provide values for each of the fields (step 1916). Well-known techniques in the art of user interfaces may be used to identify and distinguish for the user required fields and optional fields. For example, required fields may be highlighted in red, marked with an asterisk, or include a parenthetical comment indicating that the field is required. In an alternative embodiment, the application 140 itself may provide all or some of the values. Once values for at least each of the required fields (and any optional fields) has been specified (step 1918), the abstract insert specification $2402_1$ is populated with the specified values (step 1920).

Figure 20A:
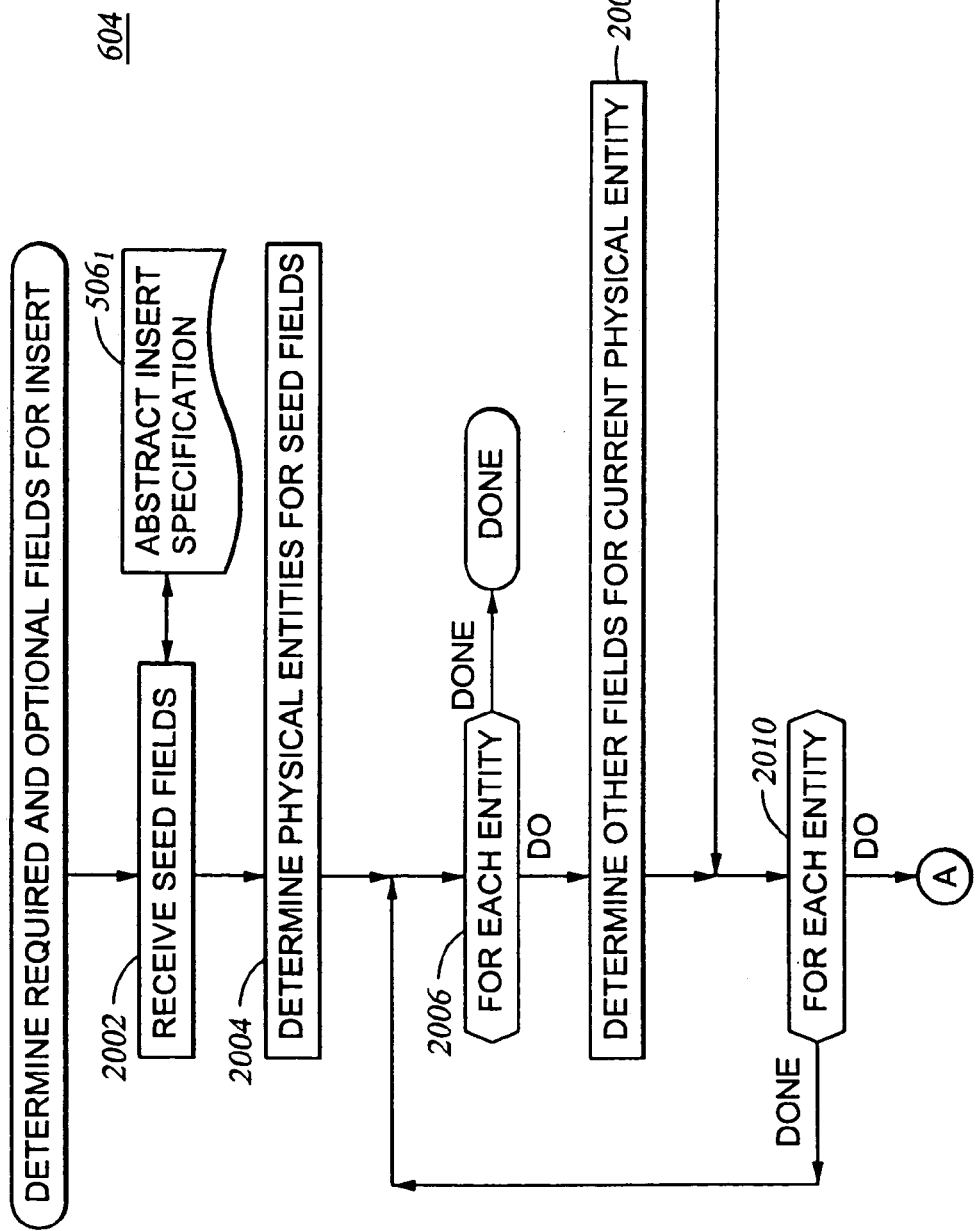
FIG. 20 is a flow chart illustrating the determination of required and optional fields in an insert operation.
Figure 20B:
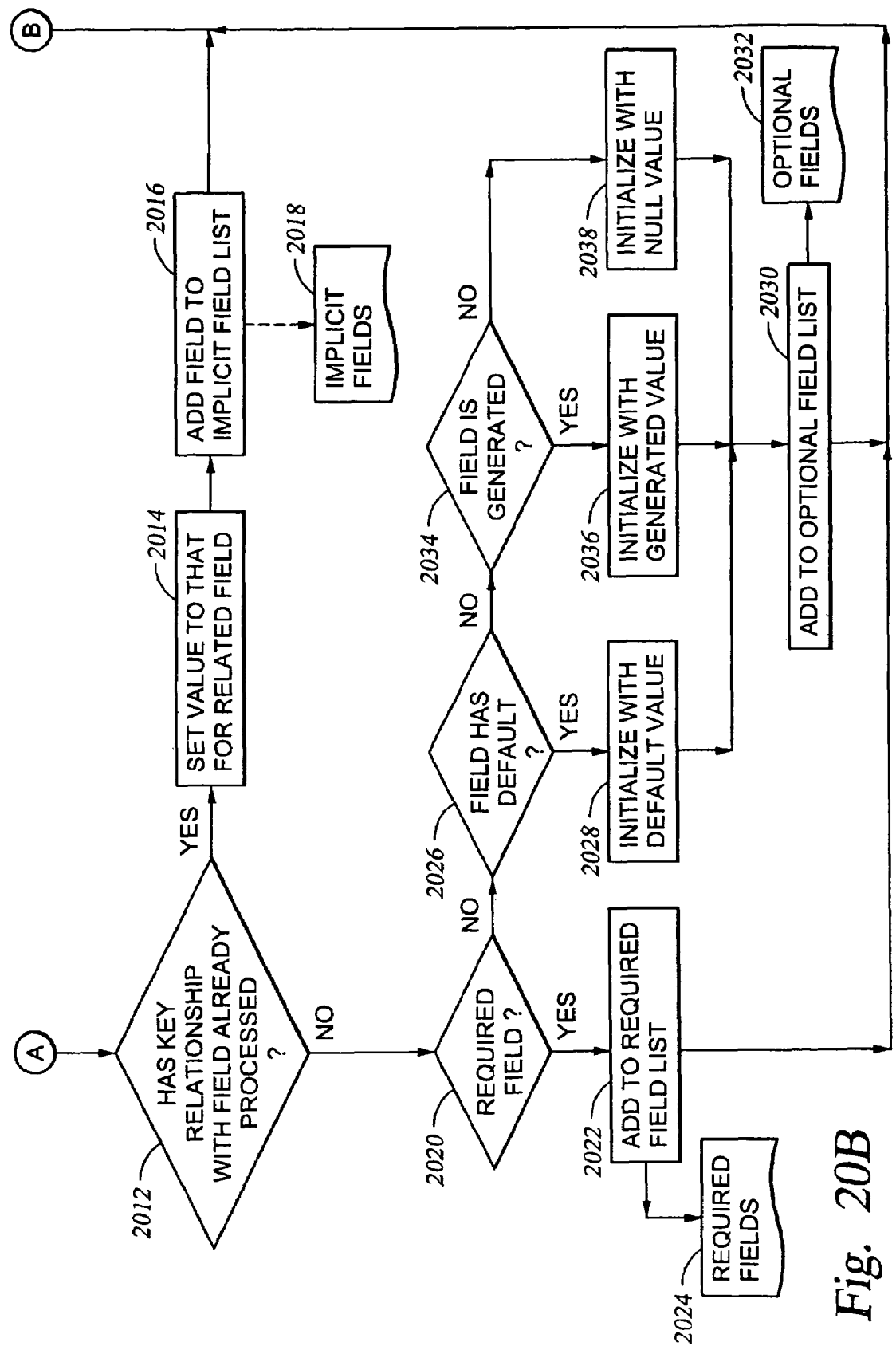

Referring now to FIG. 20, one embodiment of step 1910 for determining required and optional fields is shown. After accessing the abstract insert specification $2402_1$ to retrieve the seed fields (step 2002) specified by the requesting entity 512, the appropriate logical field specification of the data repository abstraction component 502 is referred to in order to determine the physical entities (e.g., tables in the relational data source 504 shown in FIG. 5) corresponding to the seed fields (step 2004). In the case of an insert operation, for each identified physical entity, the data repository abstraction is used to determine other logical fields associated with the same physical entity (steps 2006 and 2008). A loop is then entered (at step 2010) for each of the determined related logical fields that define a particular physical entity referenced by a seed field. That is, a series of steps is performed for each of the related logical fields of each physical entity. For a given logical field of a given physical entity, a determination is made as to whether a key relationship for the given logical field has already been processed (step 2012). For the first iteration of the loop entered at step 2006 the determination made at step 2012 is answered in the negative. During subsequent iterations, step 2012 ensures that once a value has been specified for a field, a subsequent and conflicting value will not be specified. Processing is then performed to determine whether the field is a required field (at step 2020), whether the field is a default value field (step 2026), or whether the field is a generated value field (step 2034). The field type is determined according to the attribute (i.e., the required attribute 514, the generate attribute 516 or the default attribute 518) present in the logical field specification for the current field being processed by the loop. If the field is required (step 2020), the field is added (step 2022) to a required field list 2024. In the case of a default attribute (step 2026), the field value is initialized with a default value (step 2028). Where the logical field specification includes a generate attribute 518 (step 2034), the field is initialized with a generated value (step 2036). In the case of both generated values and default values, the corresponding fields are added (step 2030) to an optional fields list 2032. If the field is not defined as any one of required, default or generated, then the field is initialized with a NULL value (step 2038) and then added (step 2030) to the optional field list 2032.

Returning to step 2012, if the current field being processed is in a key relationship (e.g., primary key/foreign key relationship) with another field which has already been processed, then the value for the current field is set to the value of the previously processed related field (step 2014). The current field is then added to an implicit field list 2018 (step 2016). Accordingly, implicit fields are created with multiple physical entities are involved in the abstract operation and those entities have key relationships. In this case, only one field and one value is exposed through the interface. The other field in the pair of key fields is considered implicit; it does not have to be specified as part of the abstract insert and will take on the same value as the corresponding key in the pair. The implicit fields are not exposed to the requesting entity, but are accounted for when the abstract insert is converted into a concrete (i.e., executable) insert statement, as will be described below with reference to FIG. 21.

Once each identified related field is processed according to the loop entered at step 2010, the processing is repeated for the next entity (step 2006). Once each entity has been processed, the processing to determine required and optional fields is complete. Accordingly, the abstract insert specification $2402_1$ is updated according to the required fields list 2014 and optional fields list 2022 (step 1912), and the required fields and optional fields are then provided to the requesting entity 512 (step 1914), as shown in FIG. 19.

Figure 21:
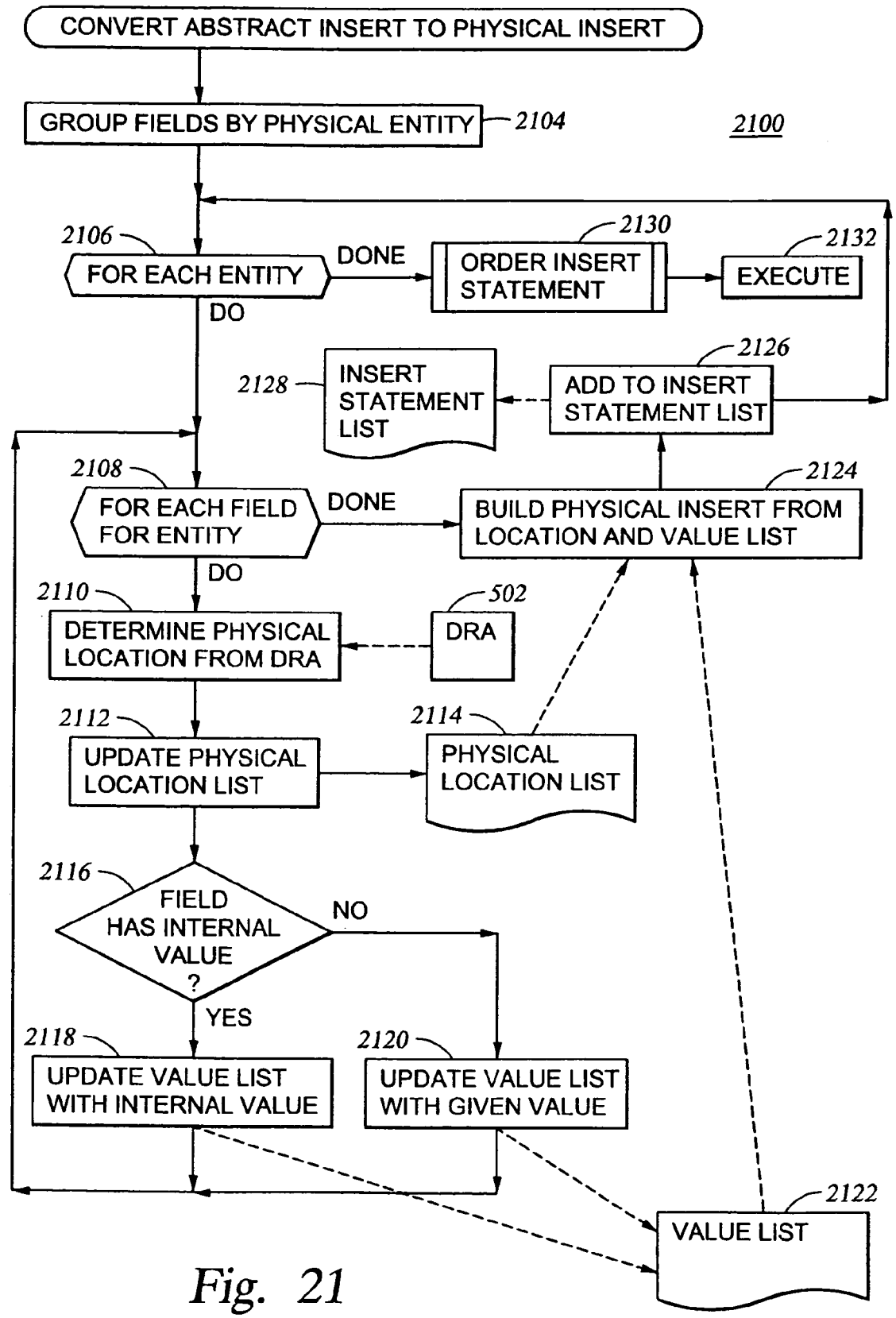
FIG. 21 is a flow chart illustrating the conversion of an abstract insert operation to a physical insert operation.

Having composed the abstract insert specification $2402_1$, the insert operation may be executed. FIG. 21 shows one embodiment of a method 2100 for executing the insert operation according to the abstract insert specification $2402_1$. Generally, upon submission of a request to execute the insert from the requesting entity 512, the run-time component 150 (described above with reference to FIG. 1) is invoked convert the abstract insert specification $2402_1$ to a physical insert operation. The physical insert operation is then executed.

Conversion of the abstract insert specification $2402_1$ to a physical insert operation is initiated by grouping fields (from the implicit field list 2018, the required field list 2024, and the optional field list 2032) according to their respective physical entities (2104). In particular, the run-time component 150 then enters a loop (step 2106) for each physical entity and a sub-loop (step 2108) for each logical field of a given physical entity. For a given logical field, the physical location of the field is determined from the data repository abstraction component 502 (step 2110). A physical location list 2114 is then updated with the determined physical location (step 2112). In some cases, the logical field may have an internal value (determined at step 2116). That is, the value of the logical field may be different from the value for the physical field. For example, the logical field name may be "Male" while the physical field name is "M". In this case, the value must be made consistent with physical value. This is done by updating a value list 2122 with the internal value (step 2118). If the field values are not different (i.e., step 2116 is answered negatively), the value list 2122 is updated with the given value for the physical field (step 2120).

Once the processing for the loop entered at step 2108 has been performed for each logical field in the abstract insert specification $2402_1$, for a given physical entity, a physical insert statement is built from the location list 2114 and the value list 2122 (step 2124). The physical insert statement is then added to an insert statement list 2122 (step 2126). The foregoing processing is then repeated successively for each entity (step 2106). Subsequently, an ordering algorithm is performed on the insert statement list 2128 (step 2130). One embodiment of the ordering algorithms is described with reference to FIG. 22. The physical insert operation is then executed (step 2132).

Figure 22:
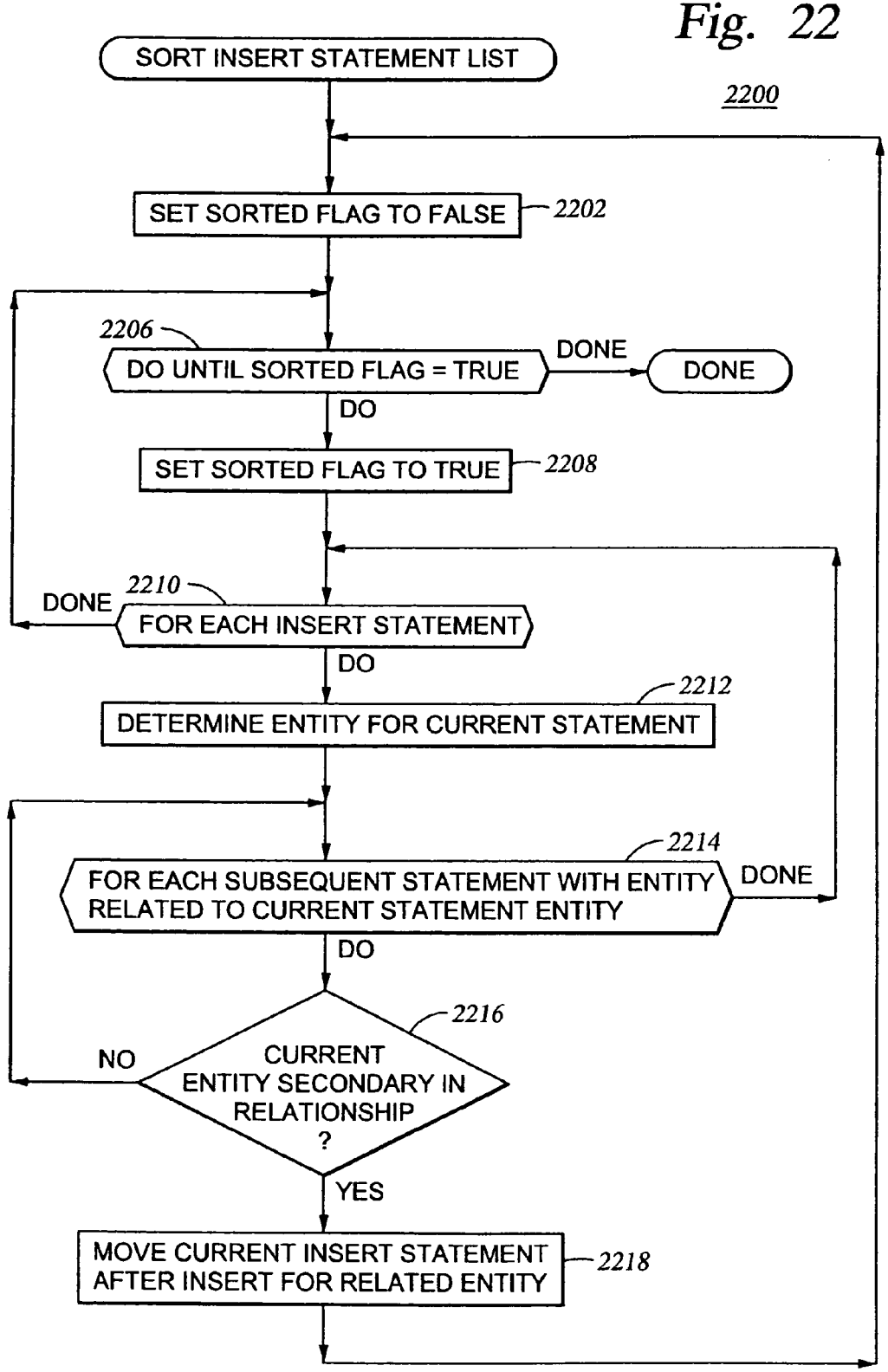
FIG. 22 is a flow chart illustrating sorting of an insert statement list to ensure a proper order of execution.

Referring now to FIG. 22, an embodiment of the ordering algorithm performed at step 2130 is described. Initially, a "sorted flag" is set to False (step 2202). A series of steps are then performed for each insert statement in the insert statement list 2128 until the "sorted flag" is set to True (steps 2206, 2208 and 2210). Specifically, for a given insert statement in the insert statement list 2128 (beginning with the first insert statement in the list), the corresponding entity is determined (step 2212). Then, the relationship between the corresponding entity of the given insert statement and each related entity of the remaining insert statements in the insert statement list 2128 is determined (step 2214 and 2216). Specifically, the run-time component 150 determines (with respect to the physical entity relationships specification 526) whether the entity of the given insert statement is a secondary entity with respect to a primary related entity of another insert statement (step 2216). If so, the given insert statement is moved to a position after the insert statement of the related entity (step 2218). This process is repeated until the insert statement list 2128 can be traversed without encountering a current entity which is secondary with respect to an entity of a subsequent statement in the insert statement list 2128. At this point, the physical insert statements in the insert statement list 2128 are ordered according to the hierarchical relationship specified in the physical entity relationships specification 526. This process ensures that a primary entity containing a primary key of a primary/foreign key pair is inserted into first, before the secondary entity (containing the foreign key) is modified.

Figure 23:
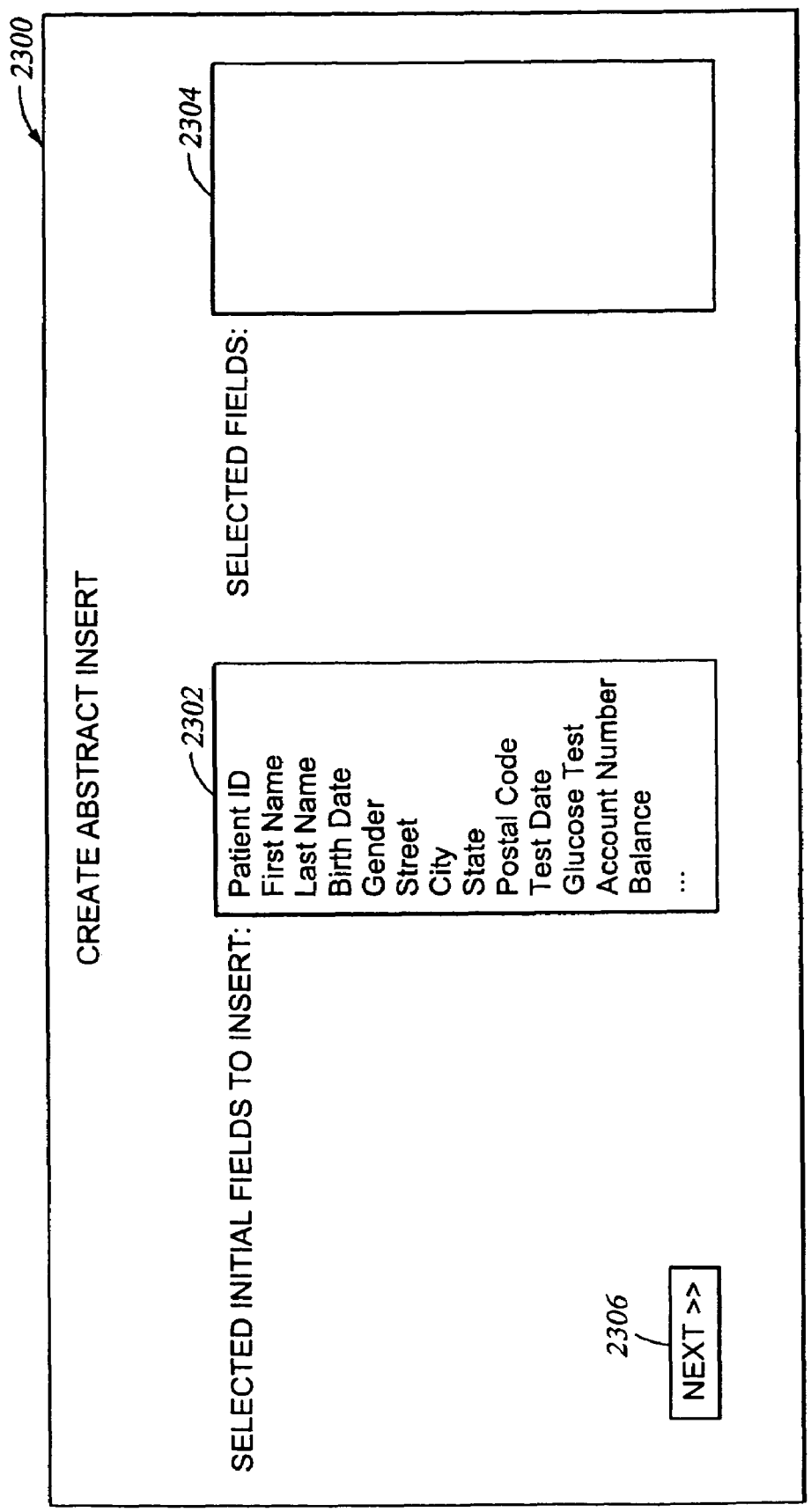
FIG. 23 is a user interface screen configured for building abstract queries.

As noted above, aspects of the invention may "guide" the requesting entity 512 (i.e., the application 140) through the process of building an abstract modification operation. This aspect can be illustrated for an insert operation with reference to FIGS. 23-26 where HTML forms 160 (shown in FIG. 1) are intelligently populated to indicate characteristics of various fields. Referring first FIG. 23, a user interface screen 2300 is shown which may be displayed when a user elects create an abstract insert. The screen 2300 includes a menu 2302 of available logical fields which may be inserted into. The fields selected by the user from the menu 2302 are displayed in a "Selected Fields" field 2304, as shown in FIG. 24. In this example, the user has selected "Last Name" and "State". Upon making the desired selections, the user clicks the "Next" button 2306 to submit the selections and proceed to the next screen 2500 shown in FIG. 25. The screen 2500 is formatted with a plurality of input fields 2502A-I which are selected according to the logical fields specified by the user in the "Selected Fields" field 2304. That is, the selected fields "Last Name" and "State" are used as seed fields in determining which fields to display in the screen 2500. In this case, "Last Name" is a logical field $510_3$ corresponding to the "PatientInfo" table 520 for which the "First Name" logical field $510_2$, "Birth Date" logical field $510_4$ and "Gender" logical field $510_6$ are also specified as related logical fields. As such, each of these logical fields is displayed as an input field (input fields 2502C, 2502E and 2502F, respectively) in the screen 2500. Similarly, the seed field "State" is used to identify the corresponding physical entity (i.e., AddressInfo table 521) and its related logical fields. Further, required fields (as defined by the presence of a required attribute 514 in the DRA 502) are marked with an asterisk (*). In this case, the input fields 2502A, 2502B and 2502C are marked as required fields. Further, generated in default fields are primed with the appropriate values. In the present example, the "Patient ID" input field 2502D is primed with a generated value. A default values not shown because none of the input fields 2502 correspond logical field specifications having a default attribute 518.

The user is then free to enter the desired values. An illustration of the input fields 2502 after having been populated with values is shown in FIG. 26. In this case, the user provided values for the required fields, and also elected to provide values for the optional fields.

Figure 27:
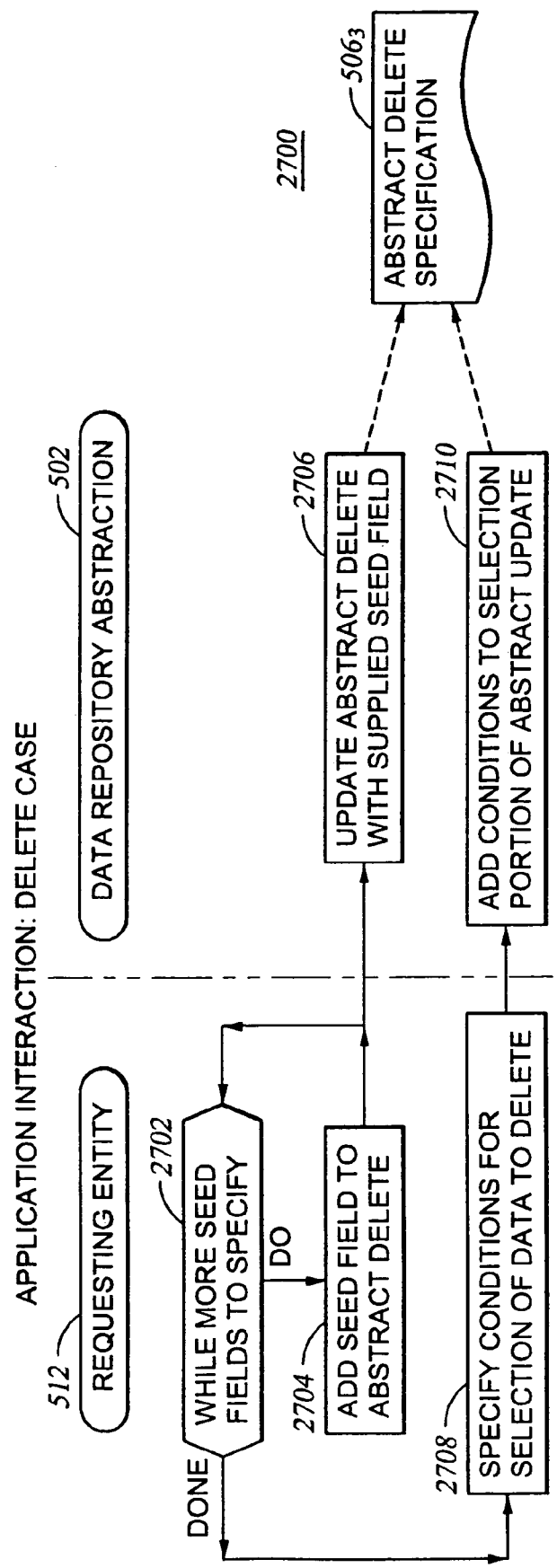
FIG. 27 is a flow chart illustrating generation of an abstract delete specification used to implement a delete operation against physical data delete operation.

Referring now to FIG. 27 an abstract delete method 2700 is described. Generally, the method 2700 describes the interaction between the requesting entity 512 and the data repository abstraction 502, which implements the abstract delete. As in each of the previous abstract modification operations, the abstract delete requires composing an abstract specification. To this end, the requesting entity 512 specifies a model entity to delete (step 2702). The seed fields for the selected model entity are then determined (step 2704) which the data repository abstraction component 502 uses to create/update abstract delete logic of the abstract delete specification $2402_2$ (step 2706). The requesting entity 512 then provides selection conditions for selection of data to delete (step 2708). The selection conditions are added to the selection portion of the abstract delete specification $2402_2$ (step 2710).

Figure 28:
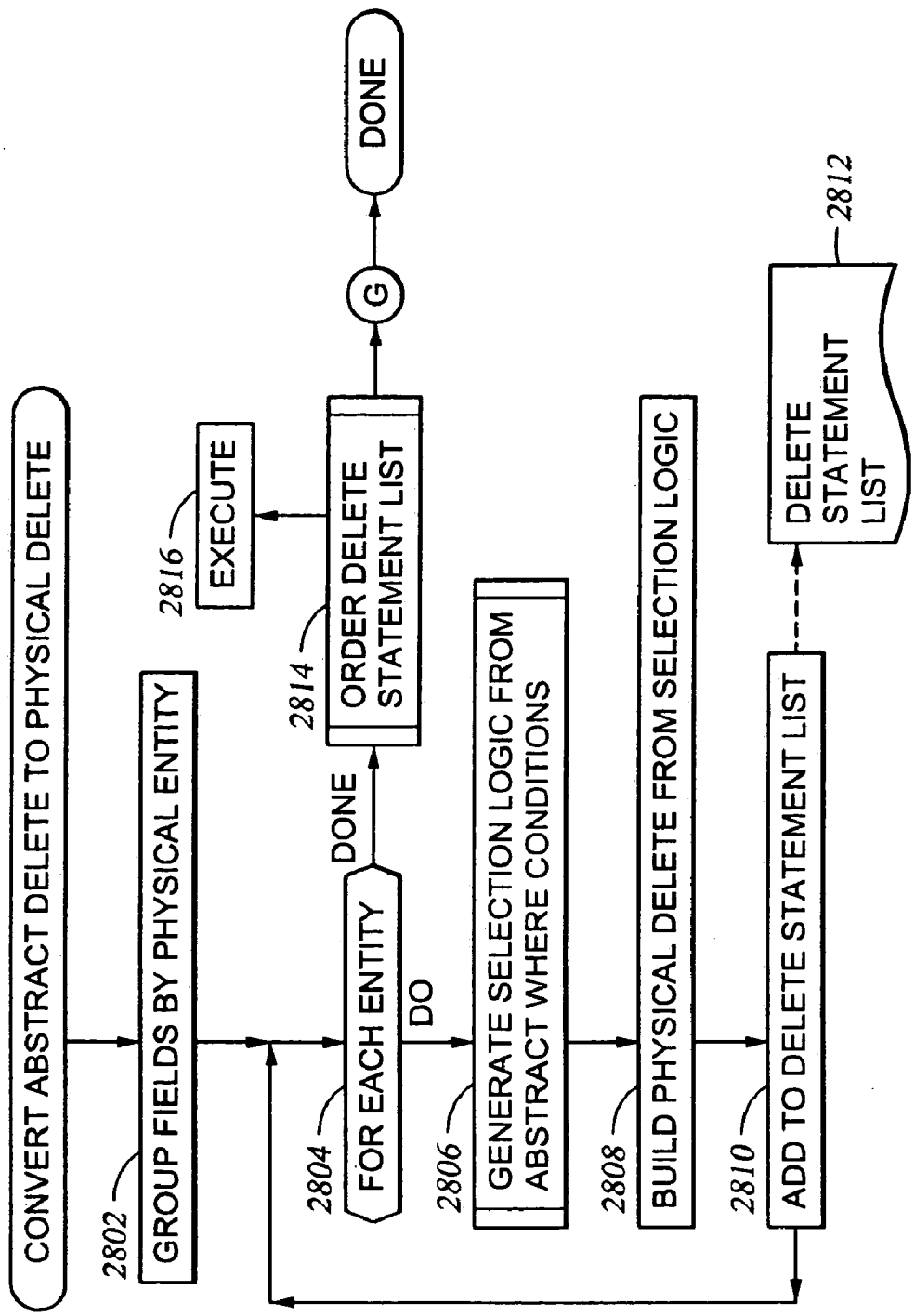
FIG. 28 is a flow chart illustrating the conversion of an abstract delete operation to a physical delete operation.

The abstract delete specification is then used by the run-time component 150 to generate an executable physical delete specification. One conversion method 2800 for converting the abstract delete to a physical delete is described with reference to FIG. 28. The conversion process is initiated when the requesting entity 512 submits a request to execute the delete operation. The run-time component 150 first groups the specified seed fields according to their respective physical entity (step 2802). That is, the run-time component 150 uses the seed value (specified by the requesting entity 512 at step 2702) and the data repository abstraction component 502 to locate the physical entity to delete from. In particular, the logical field specification of the data repository abstraction component 502 corresponding to the seed field is identified. The identified logical field specification provides the necessary logic (i.e., the appropriate access method) to access the physical entity to delete from. For each physical entity (step 2804), the run-time component 150 generates selection logic according to the selection conditions specified in the abstract delete specification $2402_2$ (step 2806). Using the determined physical entity and the generated selection logic, the run-time component 150 builds a physical delete statement (step 2808) which is added to a delete statement list 2812 (step 2810). The statements in the delete statement list 2812 are then ordered (step 2814) and executed (step 2816).

Figure 29:
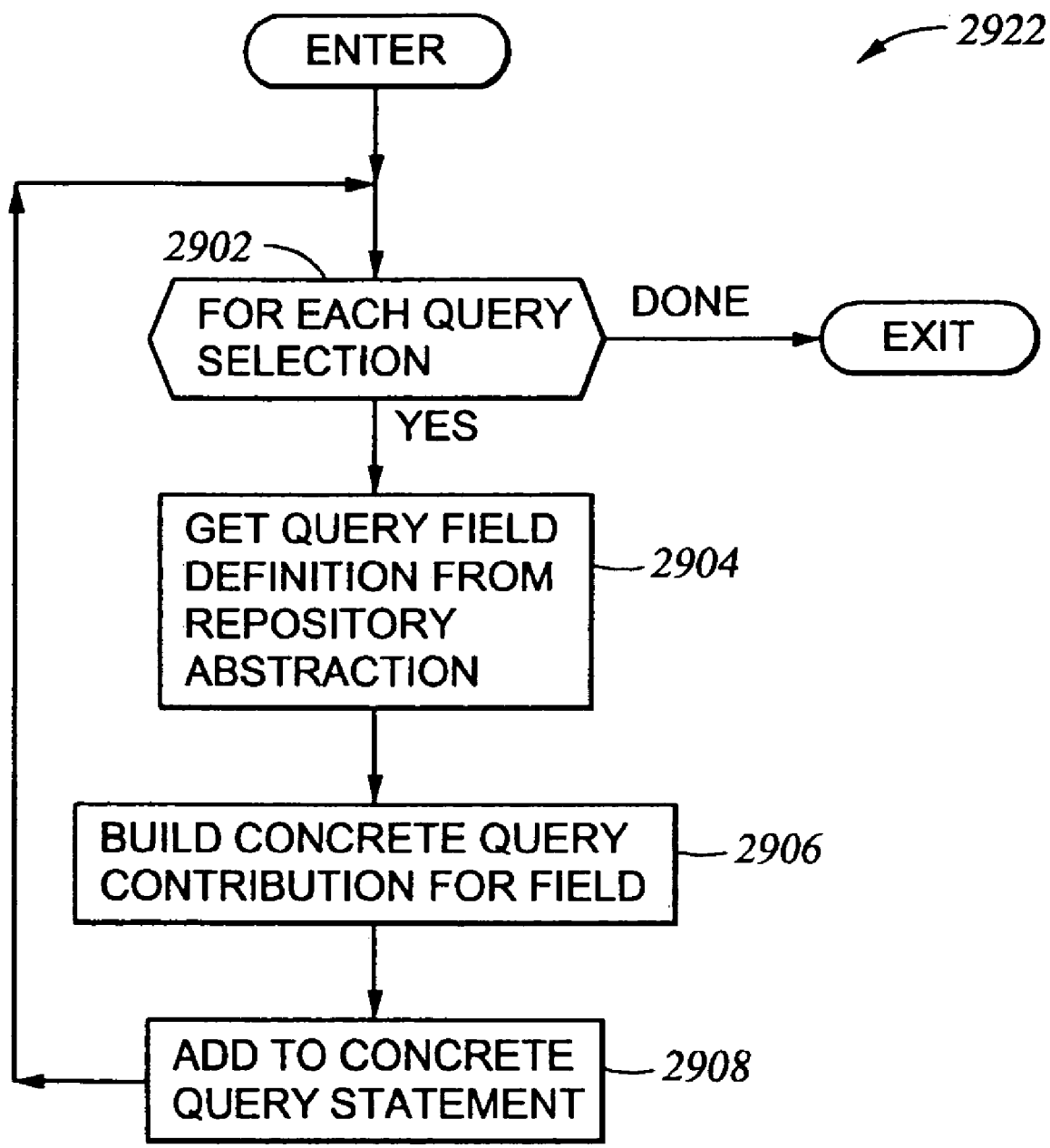
FIG. 29 is a flow chart illustrating the generation of selection logic for an abstract update operation.

One embodiment for generating the selection logic at step 2806 of the method 2800 is shown in FIG. 29. It is noted that step 2806 substantially involves performing steps 306, 308, 310 and 312 of FIG. 3. Accordingly, for each selection criterion (step 2902), the specified field definition is retrieved from the abstraction component 502 (step 2904). A concrete/physical selection contribution is built (step 2906) and then added to the selection portion of the update statement (step 2908). The logic for building the concrete/physical selection contribution is substantially the same as was described for queries with respect to FIG. 4 and, therefore, will not be described again in detail here.

Figure 30:
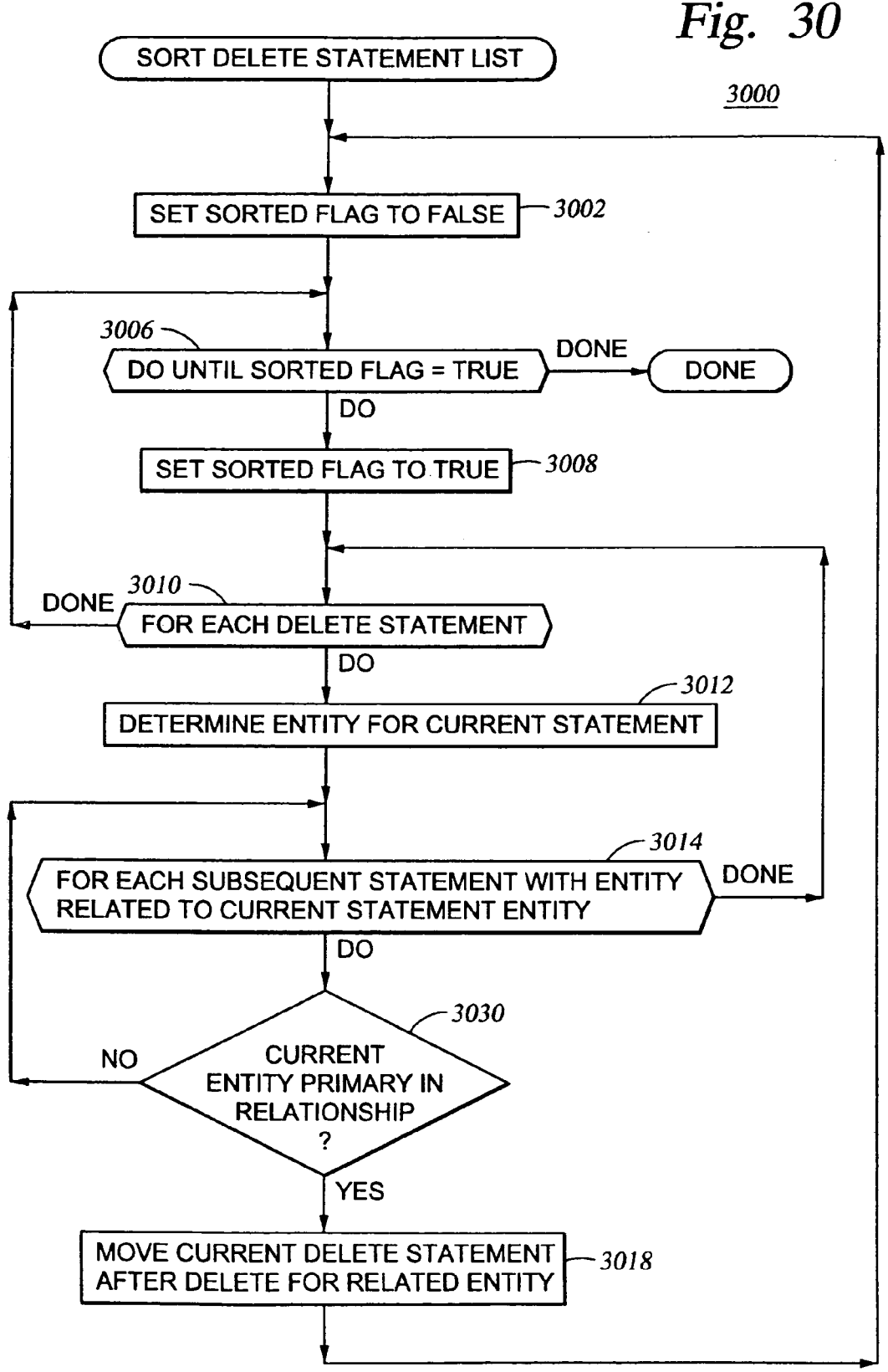
FIG. 30 is a flow chart illustrating sorting of a delete statement list to ensure a proper order of execution.

One embodiment of the ordering performed at step 2814 is described with reference to FIG. 30. Initially, a "sorted flag" is set to False (step 3002). A series of steps are then performed for each delete statement in the delete statement list 2812 until the "sorted flag" is set to True (steps 3006, 3008 and 3010). Specifically, for a given delete statement in the delete statement list 2812 (beginning with the first delete statement in the list), the corresponding entity is determined (step 3012). Then, the relationship between the corresponding entity of the given insert statement and each related entity of the remaining delete statements in the delete statement list 2812 is determined (step 3014 and 3016). Specifically, the run-time component 150 determines (with respect to the physical entity relationships specification 526) whether the entity of the given delete statement is a primary entity with respect to a secondary related entity of another delete statement (step 3016). If so, the given delete statement is moved to a position after the delete statement of the related entity (step 3018). This process is repeated until the delete statement list 2812 can be traversed without encountering a current entity which is primary with respect to an entity of a subsequent statement in the delete statement list 2812. At this point, the physical delete statements in the delete statement list 2812 are ordered according to the interrelationship specified in the physical entity relationships specification 526. This process ensures that a primary entity containing a primary key of a primary/foreign key pair is deleted last, after the secondary entity (containing the foreign key) is deleted.

It should be noted that the embodiments described above are merely illustrative and not exclusive. Persons skilled in the art will recognize other embodiments within the scope of the invention. For example, the foregoing describes an embodiment in which order dependencies are defined as part of the abstract data representation component 148 (i.e., order dependencies are defined in the physical entity relationships specification 526). Thus, changes in order dependencies require changes in the abstract data representation, but allow the application to be used without changes. An alternative embodiment provides for a less rigid definition of order dependencies by allowing for a higher degree of automation in the determination dependencies. That is, given the physical entity relationships specification 526 defined in an abstract data representation, the sequencing of operations could be determined dynamically by applying a rule set such as the following: (i) insert operations involving a key field need to insert into the primary entity before any related entities; (ii) update operations involving a key field could be restricted or automatically propagated from the primary entity first followed by all related entities; (iii) delete operations involving a row that includes a key field could be restricted or automatically propogated from the secondary entities to the primary entity; and (iv) operations for completely unrelated entities would be executed in any order.

In still another embodiment, it is contemplated that the database is checked for referential integrity cascade operations. In this case, the database itself handles some of the work and allows DRA 148 to effectively 'ignore' those low level operations, and only perform the high level ones. As such, this invention can 'patch' referential integrity holes in legacy databases that may no longer be fixable at the database layer because of assumptions built into legacy applications that use the database.

While the foregoing is directed to embodiments of the present invention, other and further embodiments of the invention may be devised without departing from the basic scope thereof, and the scope thereof is determined by the claims that follow.

What is claimed is:

1. A method for constructing abstract queries defined by a plurality of logical fields which map to a plurality of physical entities of physical data having a particular physical data representation in a database stored on a computer server having a memory and one or more processors, wherein each of the plurality of physical entities is a table in the database, the method comprising:

receiving user input via a user interface, the input comprising a reference to a model entity definition comprising two or more logical fields, wherein a model entity corresponding to the model entity definition is selected as a focus for an abstract query the abstract query being composed from the plurality of logical fields via the user interface, each logical field providing a query component available to be included in an abstract query specifying one of a condition for the abstract query or an output field of the abstract query, and wherein each logical field includes a logical field name used to identify the logical field in the user interface and an access method selected from at least two distinct access method types, wherein the access method specifies a mapping between a respective logical field and one of the physical entities of physical data; and based on the model entity definition, selectively adding at least one logical field to the abstract query, wherein selectively adding the at least one of logical field comprises:

determining, based on the model entity definition of the selected model entity, at least one logical field required as an output field for an abstract query of the selected model entity, determining whether the at least one logical field is already present as an output field in the abstract query, and if not, adding the at least one logical field to the abstract query.

2. The method of claim 1, wherein receiving the user input via the user interface further comprises:

receiving a plurality of abstract query contributions for the abstract query, wherein the plurality of abstract query contributions are defined by selected logical fields and a corresponding value for each of the selected logical fields; and receiving a plurality of output fields for the abstract query, wherein the plurality of result fields is defined by selected logical fields.

3. The method of claim 2, further comprising:

converting the abstract query into a physical query consistent with the tables in the database; and executing the physical query.

4. The method of claim 3, wherein converting the abstract query into the physical query comprises mapping each of the logical fields of the abstract query to respective tables in the database.

5. A method for constructing abstract queries defined by a plurality of logical fields which map to a plurality of physical entities of physical data having a particular physical data representation in a database stored on a computer server having a memory and one or more processors, the method comprising:

receiving, via a user interface, an abstract query composed from a plurality of logical fields defined by a data repository abstraction component, the abstract query comprising:

(i) a selection of a model entity definition comprising two or more logical fields, of a plurality of logical fields, each corresponding to a separate physical entity in the database, wherein the selection specifies a model entity corresponding to the model entity definition to use as a focus for the abstract query composed via the user interface, and wherein each of the plurality of logical fields provides a query component that may be included in an abstract query specifying one of a condition for the abstract query and an output field of the abstract query, and wherein each logical field includes a logical field name used to identify the logical field in the user interface and an access method selected from at least two distinct access method types, wherein the access method specifies a mapping between a respective logical field and physical data in the database;

(ii) a plurality of query conditions defined by selected logical fields and a corresponding value for each of the selected logical fields; and (iii) at least one result field defined by selected logical fields; determining whether the abstract query includes more than one ANDed query condition for a given logical field corresponding to a physical entity; and upon determining a one-to-many relationship exists between the model entity definition and the physical entity corresponding to the given logical field, generating a query contribution against a replicated instance of the physical entity corresponding to the given logical field for each instance of the more than one ANDed query condition.

6. The method of claim 5, further comprising:

generating a result field contribution for the abstract query; and generating correlation logic between each physical entity involved in the abstract query.

7. The method of claim 6, wherein each physical and the involved in the abstract query is a table in the database and wherein generating correlation logic comprises joining each table.

* * * * *